US011002957B2

(12) United States Patent
Erkkilä et al.

(10) Patent No.: US 11,002,957 B2
(45) Date of Patent: May 11, 2021

(54) SCANNING OPTICAL DEVICE WITH BROADENED IMAGE AREA

(71) Applicant: MURATA MANUFACTURING CO., LTD., Nagaokakyo (JP)

(72) Inventors: Jouni Erkkilä, Helsinki (FI); Tero Sillanpää, Espoo (FI); Matti Liukku, Helsinki (FI); Anssi Blomqvist, Helsinki (FI)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 184 days.

(21) Appl. No.: 16/402,958

(22) Filed: May 3, 2019

(65) Prior Publication Data
US 2019/0339514 A1    Nov. 7, 2019

(30) Foreign Application Priority Data
May 3, 2018  (FI) ..................................... 20185409

(51) Int. Cl.
*G02B 27/00*    (2006.01)
*G01S 7/481*    (2006.01)
(Continued)

(52) U.S. Cl.
CPC ........ *G02B 27/0081* (2013.01); *G01S 7/4817* (2013.01); *G02B 26/0858* (2013.01); *G02B 26/101* (2013.01)

(58) Field of Classification Search
CPC ............ G02B 27/0081; G02B 26/0858; G02B 26/101; G02B 26/105; G02B 26/0841;
(Continued)

(56) References Cited

U.S. PATENT DOCUMENTS 6,283,372 B1    9/2001  Li
6,735,004 B1    5/2004  Hagelin et al.
(Continued)

FOREIGN PATENT DOCUMENTS

EP    0120329 A2    10/1984
EP    3173842 A1     5/2017
(Continued)

OTHER PUBLICATIONS

Sep. 9, 2019 Search Report issued in European Patent Application No. 19171511.
(Continued)

*Primary Examiner* — Jennifer D. Carruth
(74) *Attorney, Agent, or Firm* — Squire Patton Boggs (US) LLP

(57) ABSTRACT

An optical device that provides a broadened circular scanning pattern. The device includes a reflector system dimensioned to form a coupled oscillator with two modes of oscillation for circular tilt motion, a first mode oscillation in a first resonance frequency and a second mode of oscillation in a second resonance frequency that is different from the first resonance frequency. A signal processing element is configured to control the actuation signals to maintain a first amplitude in the first mode of oscillation, and a second amplitude in the second mode of oscillation.

19 Claims, 16 Drawing Sheets

(51) Int. Cl.
*G02B 26/08* (2006.01)
*G02B 26/10* (2006.01)

(58) Field of Classification Search
CPC . G02B 26/085; G02B 26/0833; G01S 7/4817; B81B 3/0083; B81B 3/0086; B81B 2203/04
See application file for complete search history.

(56) References Cited

U.S. PATENT DOCUMENTS

| | | | |
|---|---|---|---|
| 9,753,280 B2* | 9/2017 | Hofmann | G02B 26/0841 |
| 10,371,940 B2* | 8/2019 | Naono | H01L 41/1876 |
| 2002/0181839 A1* | 12/2002 | Brown | G02B 26/105 |
| | | | 385/16 |
| 2005/0156481 A1* | 7/2005 | Zhou | G02B 26/106 |
| | | | 310/309 |
| 2011/0080627 A1 | 4/2011 | He et al. | |
| 2012/0206782 A1 | 8/2012 | Chan et al. | |
| 2012/0320379 A1 | 12/2012 | Hofmann et al. | |
| 2013/0127800 A1 | 5/2013 | Billep et al. | |
| 2016/0004070 A1 | 1/2016 | Kuisma | |
| 2016/0069686 A1* | 3/2016 | Lee | G01C 19/661 |
| | | | 356/460 |
| 2017/0188021 A1 | 6/2017 | Lo et al. | |
| 2018/0059406 A1 | 3/2018 | Torkkeli | |
| 2018/0231715 A1* | 8/2018 | Bishop | G02B 26/02 |
| 2020/0271920 A1* | 8/2020 | Hirata | G01S 7/4972 |

FOREIGN PATENT DOCUMENTS

| | | |
|---|---|---|
| EP | 3287830 A1 | 2/2018 |
| JP | 2012532350 A | 12/2012 |
| JP | 2017167254 A | 9/2017 |
| WO | WO 2016/001833 A1 | 1/2016 |
| WO | 2014068846 A1 | 9/2016 |

OTHER PUBLICATIONS

Finnish Search Report dated Nov. 30, 2018 corresponding to Finnish Patent Application No. 20185409.

* cited by examiner

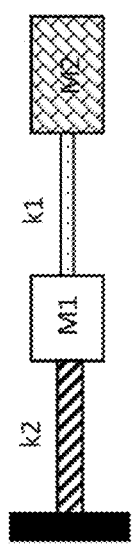
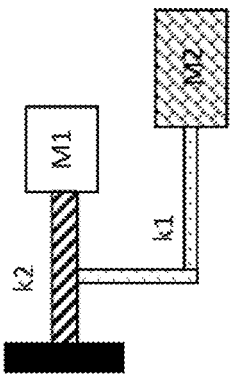
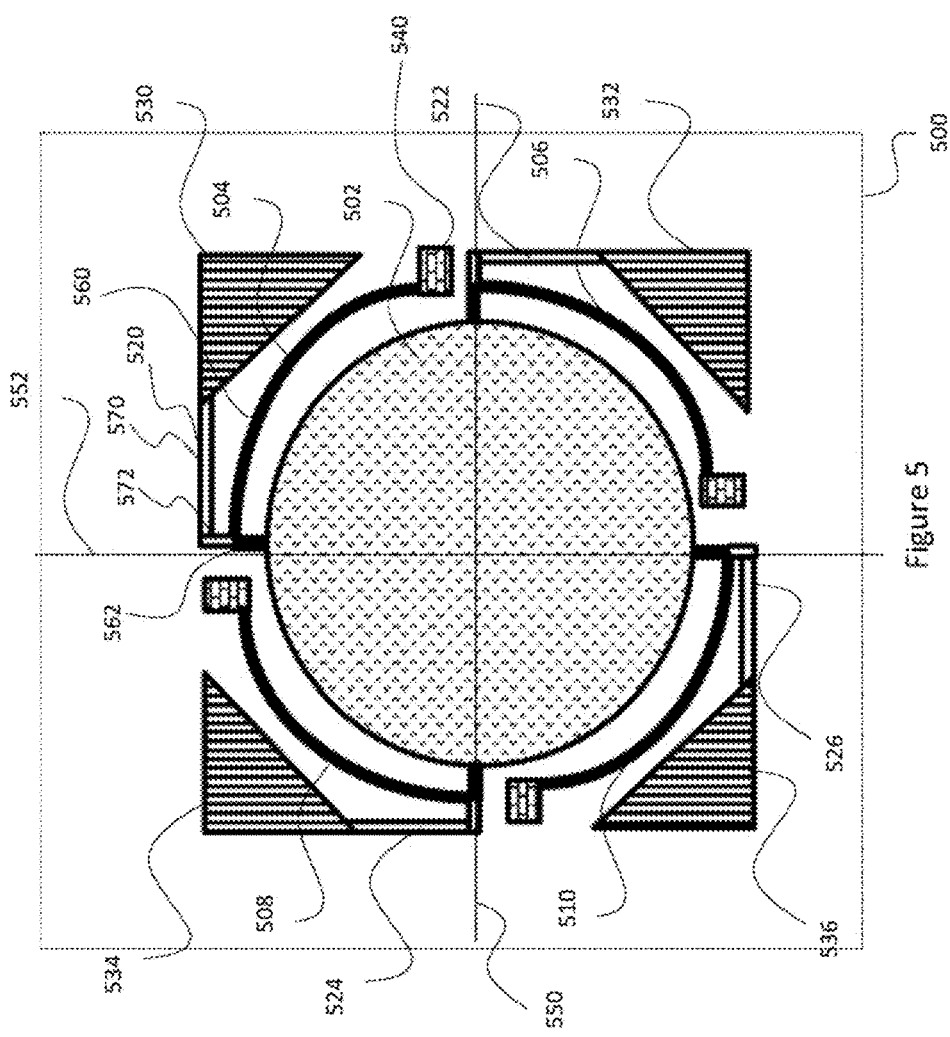

SCANNING OPTICAL DEVICE WITH BROADENED IMAGE AREA

FIELD OF THE DISCLOSURE

The present disclosure relates to optical devices with a reflective surface, actuated into a circular scanning motion.

BACKGROUND OF THE DISCLOSURE

Scanning reflectors can be used in imaging devices such as light-detecting and ranging sensors (LIDARs). A scanning reflector may contain at least one moving reflector which can reflect light beams from a laser emitter towards the surrounding environment. Additional reflectors or lenses may be included in the light path between the moving reflector and the environment. Returning light beams can be reflected inward towards a photodetector by the same reflectors or lenses which reflected the outgoing beam.

The imaging area (i.e. the field of view) of a scanning reflector refers to a region in space that a light beam reflected from the reflector can fall on. The imaging area is in part determined by how much and in which way the moving reflector can be tilted. This is illustrated in FIG. 1, which shows a simplified two-dimensional sketch of a reflector system. A laser emitter 11 emits a light beam 111. Let us assume a moving reflector 12 is suspended from a torsion beam and can be rotated about the z-axis in a see-saw manner. The reflector 12 is shown with a solid line in the position where it has rotated to its counter-clockwise extremity. The light beam 121 reflected from this position is also shown with a solid line. The reflector 12 is shown with a dashed line in the position where it has rotated to its clockwise extremity. The light beam 122 reflected from this position is also shown with a dashed line. In this simplified sketch, the scanning trajectory of the reflector in the zy-plane would be a line, the length of which is determined by a scanning angle α between the two beams 121 and 122. The line represents here an exemplary image area of the reflector system. In more general, the term image area of a reflector system is used herein to refer to an area delimited by a scanning trajectory of the reflector system. In the example of FIG. 1, the image area varies in one dimension and its extent depends on the scanning angle α. The scanning angle α is determined by the range of tilt angles, which the reflector 12 can obtain.

For a multidirectional scanning motion, a more complex movement that involves lifting and sinking of the various reflector sides in a suitably coordinated and timed order is needed.

One form of multidirectional scanning motion, called herein wobble motion, can be generated with a system, which is schematically illustrated in FIG. 2. The shown reflector system includes a circular reflector 21 in the yz-plane. This reflector 21 is suspended from a support 22 by four actuators 221, 222, 223 and 224, fixed in symmetrically located positions around the edge of the reflector 21. Each actuator is controlled by a voltage and each actuator can lift the reflector edge upwards or sink it downwards at the point where the actuator is fixed to the edge.

By coordinating the lifting and sinking movements of each actuator suitably, the reflector surface can be tilted away from the yz-plane such that normal of the reflector surface diverges to an angle from the x-axis. For example, if actuator 224 lifts the edge to which it is fixed, while actuator 222 sinks the edge to which it is fixed, and both 221 and 223 keep the edges to which they are fixed in a middle position, then the reflector movement mimics tilting about the y-axis. If actuator 221 lifts while actuator 223 sinks, and both actuator 222 and actuator 224 stay in a middle position, then the reflector movement mimics tilting about the z-axis. For the multidirectional scanning mode, the moving reflector 21 can be arranged to oscillate about two orthogonal axes of rotation in phase difference, and the resulting position of the reflector is a superposition of the two oscillations. If the reflector is driven to oscillate at a resonant frequency, the maximum tilt angle can be written as $$\theta = 2QF/(\pi^2 M f_{res}^2 r).$$

where Q is energy stored in the reflector/energy loss per vibration cycle, M is the mass of the reflector, r the radius of the reflector, $f_{res}$ is the resonance frequency, and F is the driving force. The driving force F can be written as $$F = \eta V$$

where n is the transductance factor of the actuator and V the applied voltage. Accordingly, to achieve a large tilt angle θ, the system has to have a large Q-value, or a very large voltage has to be used to drive the tilting. Using a very large driving voltage is not practical, but Q-values in the order of 1000-10000, or even more, can be achieved when the reflector is vacuum packaged into a structural system element.

When the orthogonal sinusoidal oscillation modes are driven in resonance with a 90 degrees phase difference, a beam reflected from the circular reflector 21 of FIG. 2 creates a circular scan trajectory on a surface parallel to the yz-plane opposite the reflector. With a suitable combination of lenses and/or reflectors, this reflected beam 121 can be further reflected or refracted such that a one-dimensional 360° scanning trajectory, corresponding to one layer of the yz-plane, is created. For image forming, however, this is not necessarily enough. A broader scan pattern that widens the image area also in the x-direction would be needed in many applications.

A conventional approach to distort the scan trajectory is direct amplitude modulation, where the common amplitude of the superposed oscillations is varied by varying the target driving force for the actuation, or adding a further deflecting force to the driving force. However, the requirement for use of high Q values creates some problems in this respect.

Notwithstanding the implementation, there is always frequency splitting of the two tilting eigen modes, and while the Q value is high, the bandwidth of each of the resonances is very narrow. This means that in controllably driven oscillation modes, very substantial changes occur in amplitude even with small shifts in frequency. It is therefore difficult in practise to maintain the required 90° phase shift between the two oscillation modes. Fluctuation in phase difference between resonance modes leads to uneven or randomly changing scanning pattern, which is not desired.

Furthermore, the system response to an external modulation signal has an exponential transient term proportional to $\sim\exp(-t/\tau)$, where τ is the system time constant. Since $$\tau = Q/\pi f r$$

we can write the transient term as $\sim\exp(-t/\tau) = \exp(-\pi f r t / Q) = \exp(-\pi \Delta f t)$. This means that the large Q-value (narrow bandwidth) creates problems if we want to change rapidly the mirror tilt angle, since the time constant is large and the transient term dies slowly.

BRIEF DESCRIPTION OF THE DISCLOSURE

An object of the present disclosure is to provide a device and a method of driving the device so as to achieve a broadened scanning pattern with a single reflective surface.

The objects of the disclosure are achieved by an apparatus which is characterized by what is stated in the independent claims. Exemplary embodiments of the disclosure are disclosed in the dependent claims.

The disclosed solution is based on controlled use of coupled oscillators. An advantage of the disclosed configuration is that the broadened scanning pattern can be achieved structurally, without direct amplitude modulation.

BRIEF DESCRIPTION OF THE DRAWINGS

In the following the disclosure will be described in greater detail by means of preferred embodiments with reference to the accompanying drawings, in which

FIG. 5 shows an example of a reflector system for providing a broadened image area;

FIG. 6A and FIG. 6B illustrate exemplary configurations for a coupled oscillator;

DETAILED DESCRIPTION OF THE DISCLOSURE

Figure 3:
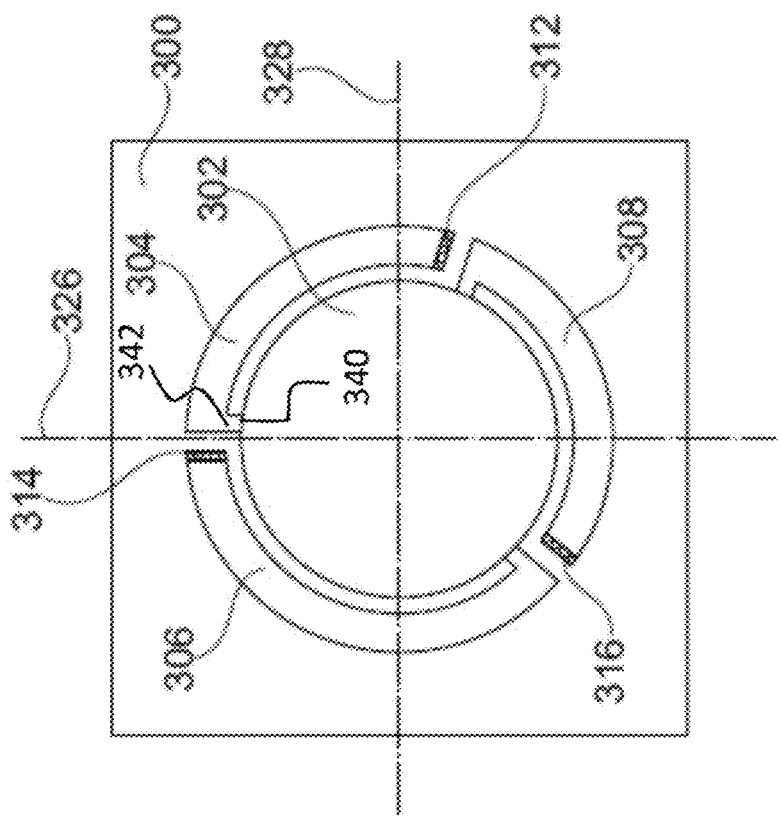
FIG. 3 illustrates basic elements of a reflector system.

Embodiments of this disclosure include an optical device that includes a reflector system and a signal processing element. FIG. 3 illustrates basic elements of a reflector system applicable in the disclosed apparatus. The reflector system comprises a support 300, a reflector 302 and a spring structure 304, 306, 308 that suspends the reflector from the support.

The term support 300 refers herein to a mechanical element that may be part of the apparatus that includes the reflector system, for example a part of a MEMS optical device. Alternatively, the support can be a separate element rigidly fixed to the apparatus. Accordingly, the support refers here to any element that provides a rigid, locally inert reference to which movable elements of the reflector system can be fixed, or from which movable elements of the reflector system can be suspended. In some embodiments of the reflector system, the support includes a supporting layer underneath and separated by an out-of-plane gap from the reflector and elements suspending the reflector in a device layer. The support and the movable elements in the device layer may be, for example, coupled to each other through one or more fixing points 312, 314, 316 protruding from the support 300. Alternatively, the support may include a frame that is part of, or rigidly fixed to the support layer and surrounds the reflector in a device layer.

The term reflector 302 refers herein to any element that includes a solid reflective surface that returns an incident wavefront of light. The law of reflection states that for each incident ray, the angle of incidence equals the angle of reflection, and the incident, normal and reflected directions are coplanar. In microelectromechanical reflector systems, a reflective surface of the reflector may be implemented, for example, by means of a silicon plate coated with a reflective coating. The reflective coating may include, for example, one or more metal thin film layers, such as aluminium, silver, gold or copper films. Alternatively, the coating may comprise a stack of one or more dielectric films with different refractive indexes, where the films are arranged so that the stack reflects light. Advantageously, the reflective surface is planar.

The spring structure comprises one or more suspenders 304, 306, 308. Each suspender is flexible such that it supports the weight of the reflector, but it also moves or allows movement of the reflector in relation to the support 300. In static, non-actuated states of the reflector, i.e. when the reflector is supported but does not move, the planar reflective surface of the plate is considered to form a reflector reference plane. Due to elasticity of the suspender material, parts of each suspender, and thus a part of the reflector coupled to the suspender, can move at least in one direction in relation to the support. A suspender 304 may include an elongate elastic element with two ends, a first end and a second end. A first end of the suspender 304 may be coupled to a first coupling point 340 in an outer edge of the planar reflective surface, and a second end of the suspender 304 may be fastened to the second coupling point 312 in the support. The suspender may be configured to deflect at least in the out-of-plane direction that is parallel to a normal to the reflector reference plane. A suspender can be, for example, a silicon beam formed from the same silicon substrate layer as a plate that forms the reflector.

The reflector system may include a first transducer structure for mechanical actuation of the reflector. In the exemplary embodiment of FIG. 3, the suspenders suspending the reflector from the support may include piezoelectric actuators. The term piezoelectric actuator refers here to a piezoelectric component which undergoes physical deformation in response to a voltage applied to the component. An actuator can be used to drive oscillating movement of the reflector when it is controlled with a periodic AC voltage signal. A bending piezoelectric actuator that deflects a suspender in the out-of-plane direction may include piezoelectric layers and conductive layers, coated on the suspender. For example, in typical MEMS optical devices, an approximately 50 μm thick layer of silicon is sufficiently thin to bend with the piezoelectric material when a voltage is applied. Bending piezoelectric actuators may include a piezoelectrically active layer, such as aluminium nitride, to facilitate actuation movement. The bending piezoelectric actuator may also include metal electrode layers on two sides of the piezoelectrically active layer so that the actuation movement can be controlled by voltage signals. The electrodes may, for example, be prepared from molybdenum, aluminium or titanium.

In the exemplary microelectromechanical reflector system of FIG. 3, each suspender 304, 306, 308 is fixed from a respective fixing point 312, 314, 316 to the support. It is noted that the suspender configuration of FIG. 3 is exemplary, the amount, form and positions of suspenders and coupling points can be varied within the scope. Coupling through a coupling point may be fixed or transmitted. Fixed coupling refers herein to a mechanically rigid connection where an end of a suspender is securely placed or fastened to a coupling point. For example, the second coupling points 312, 314, 316 to the support may be fixed, and provide also a route for leads of electrical connection to the suspender actuators. Transmitted coupling refers herein to a configuration where an end of a suspender is connected to a coupling point through an element that may deflect or twist between them. For example, in order to reduce risk of breakages, the connection between the first end of the suspender 304 and the first coupling point 340 in the reflector 302 may be a transmitted coupling that directly relays the movement of the first coupling point 340 in the out-of-plane direction through an element 342, but the element 342 enables slight bending in the extremes of the suspender deflection.

If the reflecting surface of the reflector in non-actuated state is considered to align to a virtual reference plane, the resilient suspenders 304, 306, 308 and the piezoelectric actuators on the suspenders enable second ends of the suspenders to move in the out-of-plane direction. These displacements may be applied to induce the reflector into a multidirectional scanning motion that can be expressed as oscillation about two axes of rotation. In FIG. 3, a first axis of rotation 326 is shown in alignment to the Y direction, and the second axis of rotation 328 is shown in alignment to the X direction, both in the virtual plane of reference that aligns here with the page of the drawing. The oscillation of the reflector 302 can be driven by applying a periodic AC voltage to one or more of the bending piezoelectric actuators extending on the elongate suspenders 304, 306, 308.

For controlled oscillation of the reflector, the reflector system may include a second transducer structure, configured to generate sense signals that represent mechanical motion of the reflector. One possible method to achieve this is to sense realized displacements or deflections of the suspenders. For this, one or more, advantageously all of the suspenders can be provided with piezoelectric sense elements, in addition to the piezoelectric actuators. The term sense element refers in this example to a piezoelectric component that generates a voltage signal in response to a physical deformation induced to it by motions of the reflector.

Figure 2:
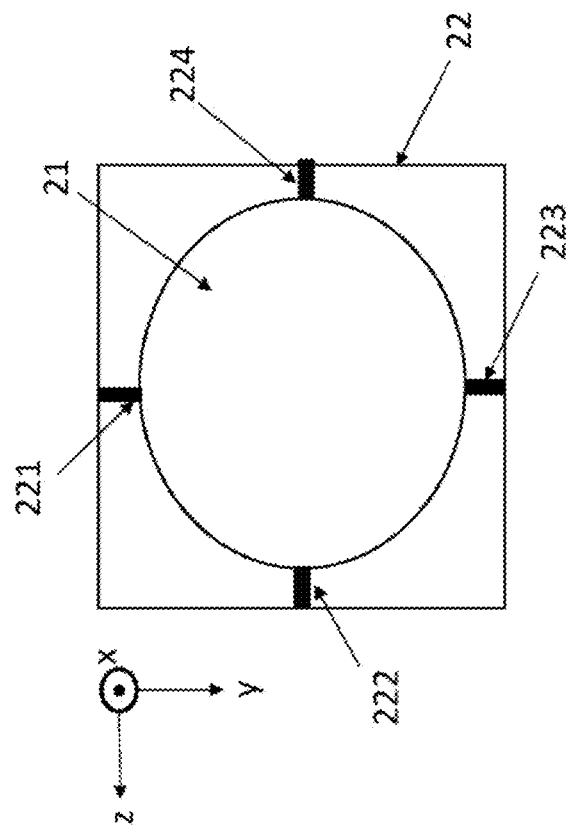
FIG. 2 illustrates schematically generation of multidirectional scanning motion.
Figure 1:
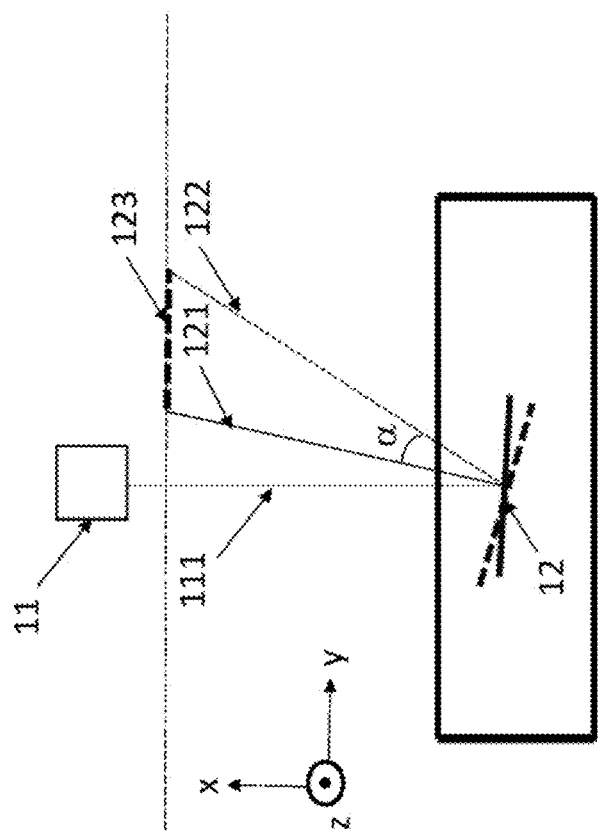
FIG. 1 shows a simplified two-dimensional sketch of a reflector system.
Figure 4:
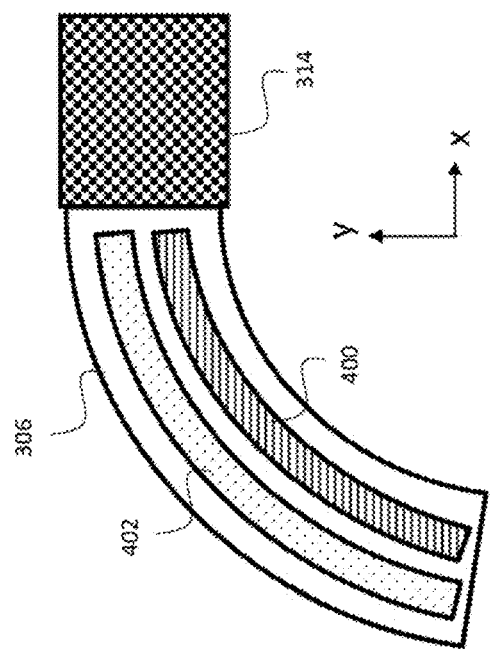
FIG. 4 illustrates an actuator and sense element on a suspender.

The first transducer structure and the second transducer structure may be configured so that each suspender of the spring structure includes an actuator element and a sense element. FIG. 4 illustrates an exemplary arrangement in which an elongate piezoelectric actuator 400 and a piezoelectric sense element 402 extend electrically separately but mechanically coupled side by side on a suspender 306 of FIG. 3. The electrical connection to a control element can be led through the one or more second coupling points 312, 314, 316. Other transducer configurations may naturally be applied within the scope. For example, piezoelectric transducers are advantageous for oscillating reflector system applications due to their compact size and low drive voltage requirement. However, capacitive actuation and sensing can be applied within the scope, as well. Implementation of capacitive sensing and detection is well known to a skilled person and will not be described in more detail herein.

The optical device may also include a signal processing element. The signal processing element may be coupled to the first transducer structure and to the second transducer structure and be configured to receive from each suspender of the spring structure a sense signal, and to provide to said suspender an actuation signal for actuating the reflector. Specifically, the signal processing element may be configured to provide to suspenders of the spring structure actuation signals for a circular tilt motion in which a normal at a point of symmetry of the planar reflective surface circulates around a normal of the reflector reference plane at the point of symmetry. Normal to a planar surface or a reference plane in this context refers to a line that is perpendicular to the surface or the plane at a given point. In the circular motion of the reflector, the given point is a point of symmetry of the reflector. For steady circular motion, the reflector is typically circular, i.e. its edges form a circle. In such case, the point of symmetry is the center of the circle.

When a light beam is made incident on the reflector undergoing the circular tilt motion, the reflected beam forms a circular scan trajectory. The circular tilt motion can be brought about by applying a periodic actuation signal successively to the suspenders. For example, in the configuration of FIG. 3, first ends of the suspenders may remain fixedly coupled to their respective coupling points in the support, and the actuators may be controlled to twist or bend such that the second ends of the suspenders displace in successive order in the out-of-plane direction. Accordingly, through controlled actuation, coupling points in the edge of the reflector can be caused to move in turns up and down in the out-of-plane direction. For the circular scan trajectory, the suspenders are optimally actuated such that all coupling points oscillate in the out-of-plane direction with the same amplitude, but with a phase difference that corresponds to the position of the coupling point in the edge of the reflector. Advantageously the coupling points are symmetrically positioned in the edges of a circular reflector. In practice, the full circle of 360 degrees of the circle of the reflector may then be divided by the number of actuating suspenders, and the phase difference in actuation corresponds to the angle between radii crossing the coupling points. For example, the phase difference for three suspenders is 120 degrees, for four suspenders 90 degrees, etc.

A general objective of reflector systems is to ensure that the power consumption required for achieving the oscillation is optimized. The greatest amplitude response is achieved by designing the reflector system to operate in resonance mode, i.e. so that both oscillations occur in a common resonance frequency. The circular scan trajectory can be modelled such that the control device is configured to provide control signals to simultaneously drive the reflector 302 to a first rotary oscillation about the first axis of rotation 326 in a first resonance frequency F11, and to a second rotary oscillation about a second axis of rotation 328 in a second resonance frequency F12. The first axis of rotation 326 and the second axis of rotation are orthogonal, and the resulting position of the reflector 302 is a superposition of the first rotary oscillation and the second rotary oscillation. When a beam of light incident on the reflective surface of the reflector 302 is reflected back, the direction of the reflected beam depends on the position of the reflector at the time of the incidence. Advantageously the first rotary oscillation and the second rotary oscillation are arranged to position the reflector such that the reflected beam moves along a controlled scan pattern, which forms image area of the reflector system. When F11 is equal to F12, denoted here as $F_1$, the circular tilt motion (also called as wobbling mode scanning motion) results in a circular scan trajectory that scans through a circular image area. Such circular tilt motion can be described with equations (1) and (2):

$$\Theta_x = A\sin(2\pi F_1 t) \quad (1)$$

$$\Theta_y = A\sin(2\pi F_1 t + \frac{\pi}{2}) \quad (2)$$

where $\Theta_x$ is the angle of the surface of the reflector 302 in respect of the first axis of rotation 326, and $\Theta_y$ is the angle of the surface of the reflector in respect of the second axis of rotation 328.

FIG. 5 shows an example of a reflector system for an optical device configured for a controlled scan pattern that provides a broadened image area. The reflector system includes a support 500, and a reflector 502, and suspenders 504, 506, 508, 510 of a spring structure. Basics of these elements may be referred from the description of FIGS. 3 and 4. The reflector system includes also inertial elements 530, 532, 534, 536, coupled to the reflector though one or more suspenders 520, 522, 524, 526 of another spring structure. The spring structure formed by the one or more suspenders 520, 522, 524, 526 between the reflector and the inertial elements constitutes a first spring structure. The spring structure formed by the one or more suspenders 504, 506, 508, 510 that couple the reflector 502, the inertial elements 530, 532, 534, 536 and the first spring structure to the support 500 constitutes a second spring structure. Each suspender 504, 506, 508, 510 of the second spring structure may include an actuator element and a sense element (not shown). Each actuator element may extend on a suspender and be configured to deflect the suspender according to an actuation signal. On the same suspender may extend a corresponding sense element configured to output a sense signal according to deflections of the suspender. Actuation signals are generated in a signal processing element (not shown) and input to actuators of the reflector system. Sense signals are generated in the reflector system and input to the signal processing element.

As shown in FIG. 5, the reflector system may comprise one or more inertial elements 530, 532, 534, 536, elastically coupled to motions of the reflector with the first spring structure of flexible suspenders 520, 522, 524, 526. Motion of the reflector may be transferred to the inertial elements directly by coupling suspenders of the first spring structure to the reflector itself, or indirectly by coupling suspenders of the first spring structure to suspenders of the second spring structure. In other words, in each suspender of the first spring structure, a first end of the suspender may be coupled to a coupling point in the reflector or in the second spring structure, and a second end of the suspender may be coupled to an inertial element. In the example of FIG. 5, the four suspenders 520, 522, 524, 526 of the first spring system are each coupled to a point in the edge of the reflector 502, and thereby to move with movements the reflector 502. Other alternatives will be described later herein.

As mentioned earlier, coupling of a suspender in a first spring structure or in the second spring structure may be fixed or transmitted. In the example of FIG. 5, each of the four suspenders 504, 506, 508, 510 of the second spring system includes a bending part that is curvedly elongate in the in-plane direction, and a short torsional part that extends perpendicular to a tangent of the bending part in the in-plane direction between one end of the bending part and a coupling point in the outer edge of the reflector 502. As an example, FIG. 5 denotes the bending part 560 and the torsional part 562 of the suspender 504. Furthermore, also each of the four suspenders 520, 522, 524, 526 of the first spring system includes a bending part that is linearly elongate in the in-plane direction, and a short torsional part that extends perpendicularly in the in-plane direction between one end of the bending part and a coupling point to the second spring structure. As an example, FIG. 5 denotes the bending part 570 and the torsional part 572 of the suspender 520. Axes of torsional parts of a suspender 504 of the second spring system and a suspender 520 of the first spring system coincide. The torsional parts are rigid in the out-of-plane direction such that out-of-the-plane motion of each coupling point in the edge of the reflector is directly relayed through the torsional parts to the connected ends of the bending parts. The torsional parts distance the reflector, the first spring system and the second spring system from each other in the in-plane direction. The torsional parts may, but do not necessarily need to, also twist to some extent to reduce fatigue and risk of breakage of the structures.

In the configuration of the first and second spring systems, the mass of the reflector and the inertial masses combine to form a coupled oscillator. The block charts of FIG. 6A and FIG. 6B illustrate exemplary configurations for a coupled oscillator. FIG. 6A corresponds with FIG. 5, where a first spring system is coupled to a coupling point in the edge of the reflector. Reference k1 may be considered to represent spring effect of the suspender 520 of the first spring structure and reference k2 spring effect of the suspender 504 of the second spring structure. M1 can be considered to represent the mass of the reflector to the suspender 504 of the second spring structure, and M2 the mass of inertial element 530. The block chart of FIG. 6B illustrates a configuration of a coupled oscillator that corresponds with FIG. 8 (to be described later), where a first spring system is coupled to a coupling point in a suspender of the second spring structure. Reference k1 may be considered to represent spring effect of the suspender 520 of the first spring structure, and reference k2 to represent spring effect of the suspender 504. M1 can be considered to represent the mass of the reflector to the suspender 504 of the first spring structure, and M2 mass of the inertial element 530.

In the coupled oscillators of FIGS. 6A and 6B, the two masses M1 and M2 are coupled such that their motions are not independent. Displacements of M1 and M2 from their positions of equilibrium in the out-of-plane direction are resultants of the interference of two simple harmonic motions in the same direction, but of different frequencies and phases. It has been now identified that in configurations like FIG. 5, the one or more inertial elements can be dimensioned in relation to the reflector element such that the circular tilt motion has two modes of oscillation, a first resonance frequency for a first mode of oscillation and a second resonance frequency for a second mode of oscillation, wherein the first resonance frequency is different from the second resonance frequency. The signal processing element may then be configured to provide an actuation signal that maintains a constant first amplitude in the first mode of oscillation, and a constant second amplitude in the second mode of oscillation. As a result, the circular tilt motion forms a scanning pattern in which the tilt angle of the reflected ray controllably varies. Such circular tilt motion can be described with equations (3) and (4):

$$\Theta_x = A_1\sin(2\pi F_1 t) + A_2\sin(2\pi F_2 t) \quad (3)$$

$$\Theta_y = A_1\sin\left(2\pi F_1 t + \frac{\pi}{2}\right) + A_2\sin\left(2\pi F_2 t + \frac{\pi}{2}\right) \quad (4)$$

where $\Theta_y$ is the angle of the surface of the reflector 502 in respect of the first axis of rotation 550, and $\Theta_x$ is the angle of the surface of the reflector in respect of the second axis of rotation 552. The first axis of rotation and the second axis of rotation are aligned with the plane of the reflector, and mutually orthogonal. $A_1$ is a selected amplitude for the first mode of oscillation, and $A_2$ is a selected amplitude for the second mode of oscillation. $F_1$ is the first resonance frequency, i.e. the resonance frequency for the first mode of oscillation, and $F_2$ is the second resonance frequency, i.e. the resonance frequency for the second mode of oscillation.

The circular scan trajectory of the second mode of oscillation can be correspondingly modelled such that the control device is configured to provide control signals to simultaneously drive the reflector 502 to a third rotary oscillation about a third axis of rotation in a second resonance frequency F21, and to a fourth rotary oscillation about a fourth axis of rotation in a second resonance frequency F22. It is noted that in FIG. 5, the third axis of rotation coincides with the first axis of rotation 550, and the fourth axis of rotation coincides with the second axis of rotation 552. However, the axes of rotation shown in drawings of this description are illustrative examples only. The first and second axes of rotation do not necessarily coincide with the coupling points of the spring systems to the reflector. Furthermore, the first and second axes of rotation for the first mode of oscillation may differ from the third and fourth axes of rotation for the second mode of oscillation. However, in the first mode of oscillation, the first axis of rotation and the second axis of ration are in the plane of the reflector surface and are perpendicular to each other, and in the second mode of oscillation, the third axis of rotation and the fourth axis of ration are in the plane of the reflector surface and are perpendicular to each other.

Accordingly, the third axis of rotation and the fourth axis of rotation are orthogonal, and the resulting position of the reflector 502 due to the second mode of oscillation is a superposition of the third rotary oscillation and the fourth rotary oscillation. When F21 is equal to F22, denoted here as $F_2$, the scanning motion of the reflector forms another a circular scan trajectory that would scan through a circular image area. A combination of the first mode of oscillation and the second mode of oscillation, as shown in equations (3) and (4) results into a circular tilt motion with a broadened image area. Minimum amplitude of the circular tilt motion, resulting from the combination of the first mode of oscillation and the second mode of oscillation is |A1−A2|, and maximum amplitude is |A1+A2|. Accordingly, the tilt angle of a ray reflected from the reflector in the circular tilt motion of equations (3) and (4) is not a circle with constant radius, but varies between two extreme values. If the first resonance frequency $F_1$ and the second resonance frequency $F_2$ are suitably selected in respect of each other, a broadened scan pattern that repeats itself with a defined system frame rate $f_{FR}$ can be achieved.

Figure 7:
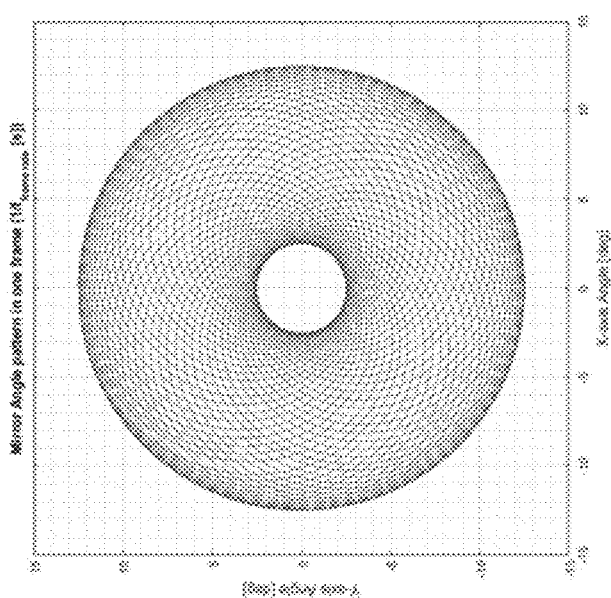
FIG. 7 shows an example of a pattern resulting from circular tilt motion.

FIG. 7 shows an example of a pattern, formed by a beam reflected from a surface of a mirror in circular tilt motion of equations (3) and (4). In the pattern of FIG. 7, each position in the line corresponds to a coordinate in the system frame at a defined point of time. For a desired system frame rate $f_{FR}$, the relation between the first resonance frequency $F_1$ and the second resonance frequency $F_2$ can be described with equation (5)

$$F_2 = (F_1 \pm f_{FR})/n \quad (5)$$

where n is an integer number. Exemplary amplitude (reflector angle) and frequency values applied for the pattern in FIG. 7 are: $A_1$=7.5 deg, $A_2$=5 deg, and $F_1$=2000 Hz, $F_2$=1015 Hz, n=2 and $f_{FR}$=30 Hz.

Figure 8:
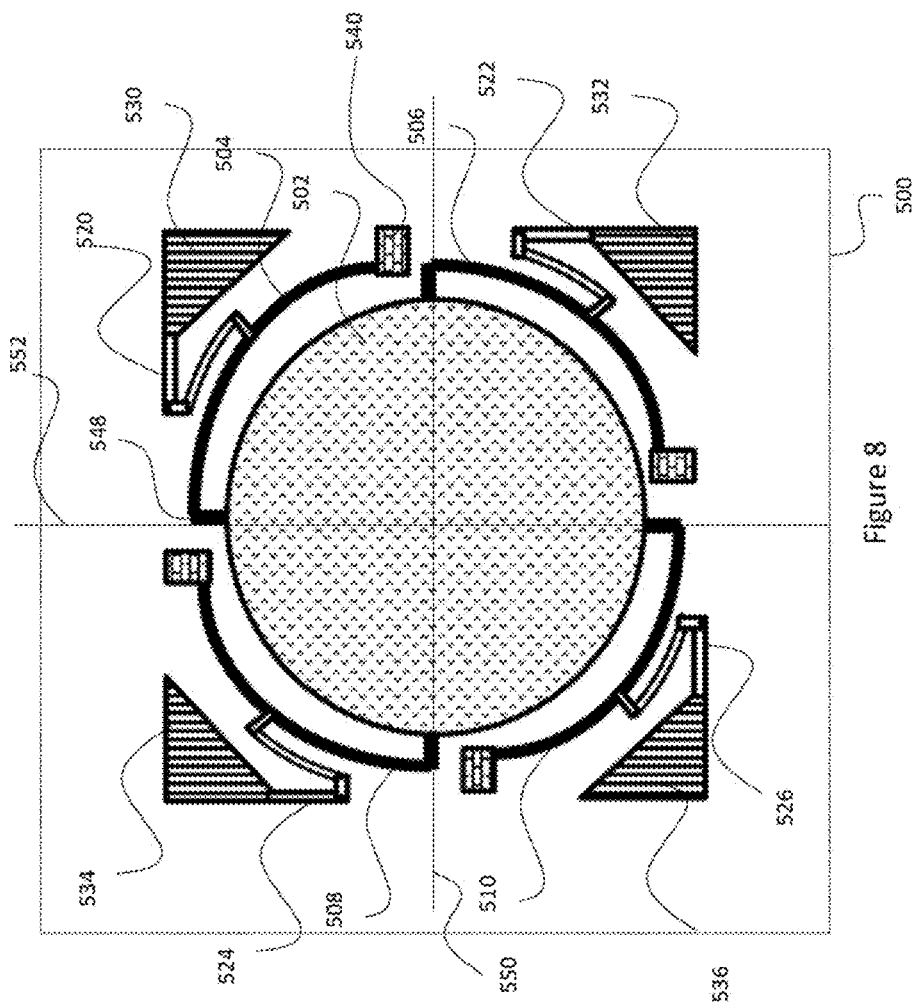
FIG. 8 illustrates another example of a reflector system structure.

A relevant design challenge in practical implementations is that the free space in the out-of-plane direction for the reflector to wobble and the inertial elements to correspondingly displace is very limited. FIG. 8 illustrates an alternative structure with a coupled oscillator shown in FIG. 6B. In the structure, the reflector system comprises again the basic parts 500, 502, 504, 506, 508, 510, described with FIG. 5, and further with FIGS. 3 and 4. In addition, the configuration includes the one or more inertial elements 530, 532, 534, 536, elastically coupled to the reflector element with a first spring structure that includes flexible suspenders 520, 522, 524, 526. As discussed earlier, in configurations of FIG. 6B, a first end of each suspender of the first spring structure is coupled to a coupling point in a suspender of the second spring structure, and a second end of the suspender is coupled to an inertial element. In the example of FIG. 8, the four suspenders 520, 522, 524, 526 of the first spring system are each coupled to a coupling point in a respective suspender 504, 506, 508, 510 of the first spring system. However, the point where a suspender of the first spring structure couples to a suspender of the second spring structure is not the point where the bending part and the torsional part of the suspender of the second spring structure meet, and in which a reflector connection is rigid in the out-of-plane direction. Each suspender of the first spring structure couples to a suspender of the second spring structure at a point that is between its coupling point to the support 500, and a coupling point to the reflector 502. For example, in the exemplary structure of FIG. 8, the suspender 520 of the first spring structure couples to the suspender 504 of the second spring structure at a point that is between the coupling point 540 of the suspender 504 to the support, and the coupling point 548 of the suspender 504 to the reflector 502. In this example, the coupling point is in the middle of the bending part of the suspender of the second spring structure, but other positions are possible within the scope. The coupling point moves with movements of the reflector, and thus provides an elastic connection between the inertial elements and the reflector. However, at the point of connection to the second spring structure, the out-of-plane motion is already smaller than in the edge of the reflector. The effect of the different configuration is that the required coupling to the movements of the reflector can be achieved with inertial elements that require less room for motion in the out-of-plane direction. In other words, when the coupling point of the suspender of the first spring structure is not in the end of the suspender of the second spring structure, the amplitude of the inertial element supported by the spring systems remains smaller in the out-of-plane direction. This enables more room for the out-of-plane amplitude of the wobble motion of the reflector.

Figure 9:
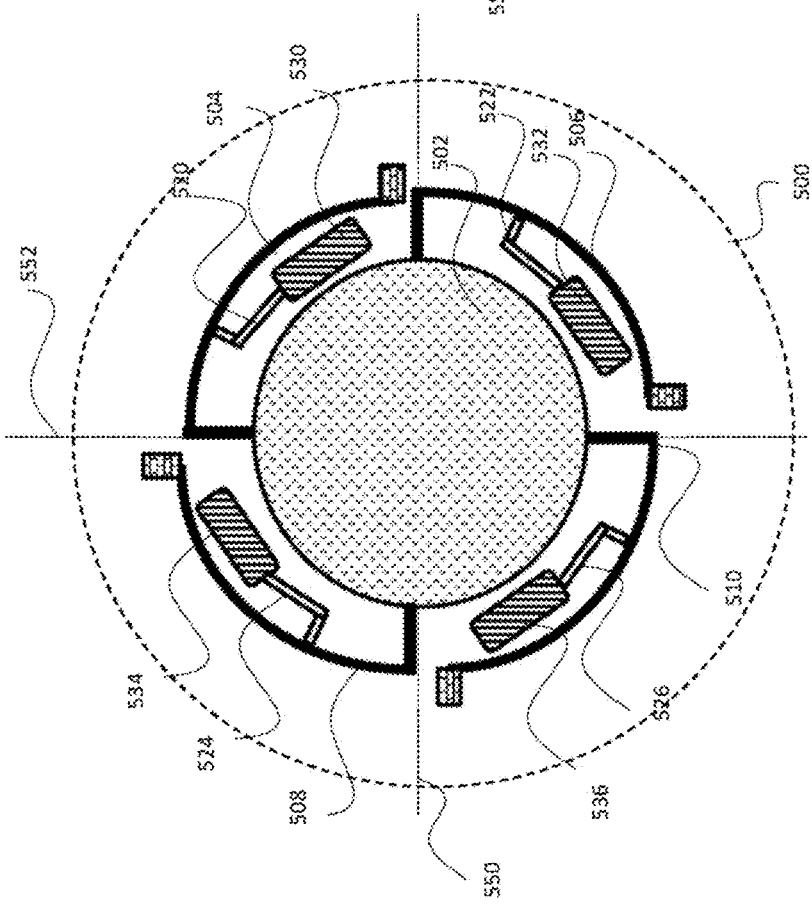
FIG. 9 illustrates an alternative structure for the coupled oscillator of FIG. 6B.

The configurations of FIGS. 5 and 8 are designed to use effectively the space outside the second spring structure and are therefore specifically optimal for optical devices with rectangular device dimensions. FIG. 9 illustrates one more alternative structure for the coupled oscillator of FIG. 6B, this time using effectively the space within the second spring structure. In the configuration, the reflector system comprises again the basic parts 500, 502, 504, 506, 508, 510, described with FIG. 5, and further with FIGS. 3 and 4. In addition, the configuration includes one or more inertial elements 530, 532, 534, 536, elastically coupled to the reflector element with a first spring structure that includes flexible suspenders 520, 522, 524, 526. In each suspender of the first spring structure, a first end of the suspender is coupled to a coupling point in the second spring structure, and a second end of the suspender is coupled to an inertial element. In the example of FIG. 9, the four suspenders 520, 522, 524, 526 of the first spring system are each coupled to a coupling point in a respective suspender 504, 506, 508, 510 of the second spring system.

Figure 10:
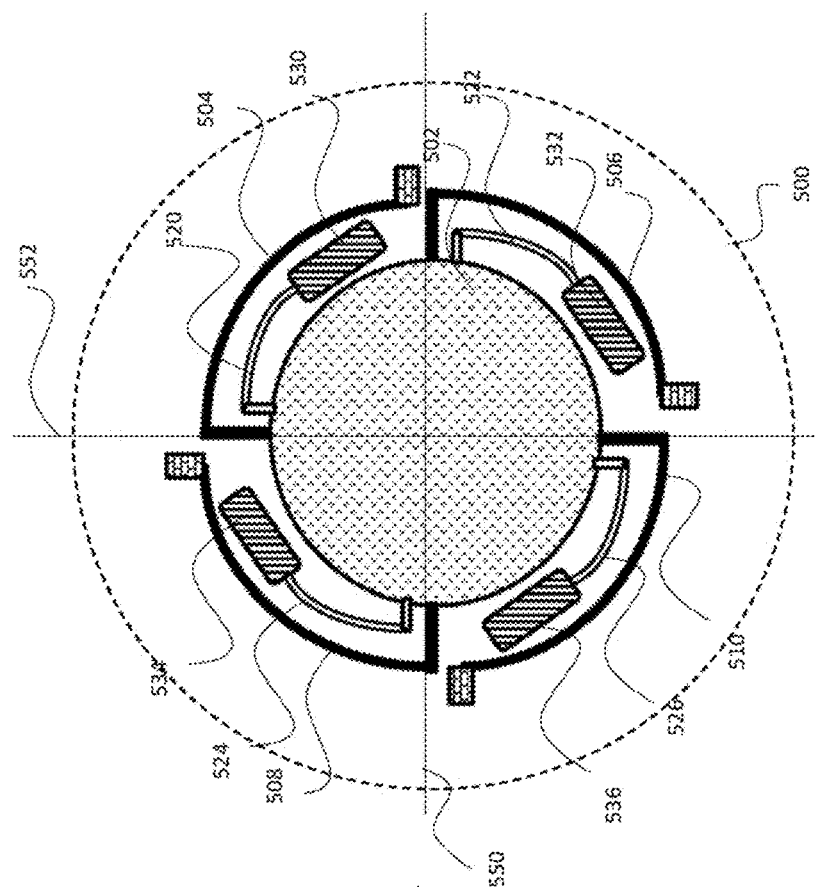
FIG. 10 illustrates an alternative structure for the coupled oscillator of FIG. 6A.

FIG. 10 illustrates an alternative structure for the coupled oscillator of FIG. 6A, also using effectively the space within the second spring structure. In the configuration, the reflector system comprises again the basic parts 500, 502, 504, 506, 508, 510, described with FIG. 5, and further with FIGS. 3 and 4. In addition, the configuration includes one or more inertial elements 530, 532, 534, 536, elastically coupled to the reflector element with a first spring structure that includes flexible suspenders 520, 522, 524, 526. In each suspender of the first spring structure, a first end of the suspender is coupled to a coupling point in the reflector element, and a second end of the suspender is coupled to an inertial element. In the example of FIG. 8, the four suspenders 520, 522, 524, 526 of the first spring system are each coupled to a coupling point in the edge of the reflector 502. Each of the four suspenders 504, 506, 508, 510 of the second spring system and each of the four suspenders 520, 522, 524, 526 of the first spring system includes a bending part that is curvedly elongate in the in-plane direction, and a short torsional part that extends in the in-plane direction perpendicular to a tangent of the bending part between one end of the bending part and a coupling point in the outer edge of the reflector 502. The torsional parts in the first spring structure are longer than the torsional parts in the second spring structure so that the spring structures are mechanically apart.

Figure 11B:
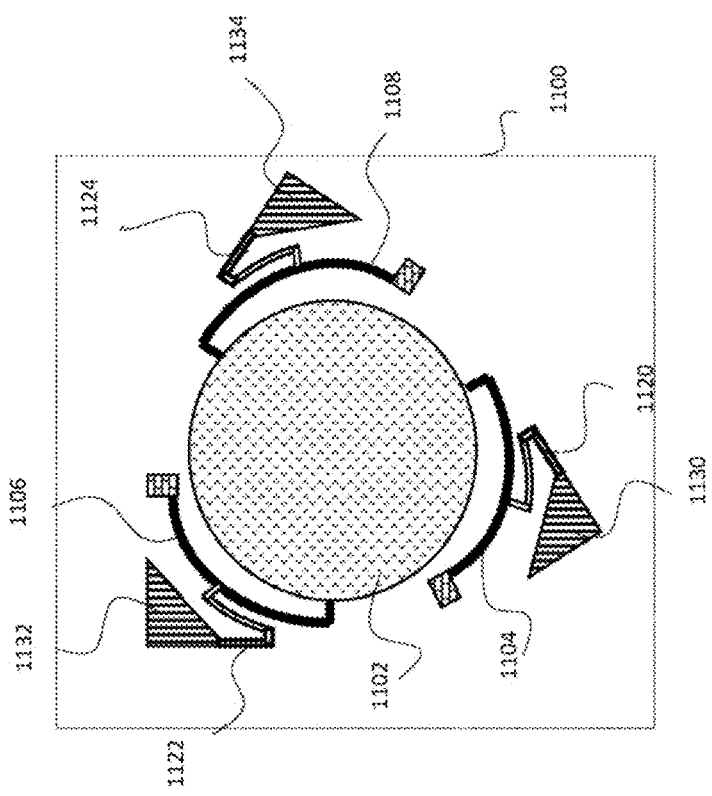
FIGS. 11A and 11B illustrate further alternative structures for the coupled oscillators of FIGS. 6A and 6B.
Figure 11A:
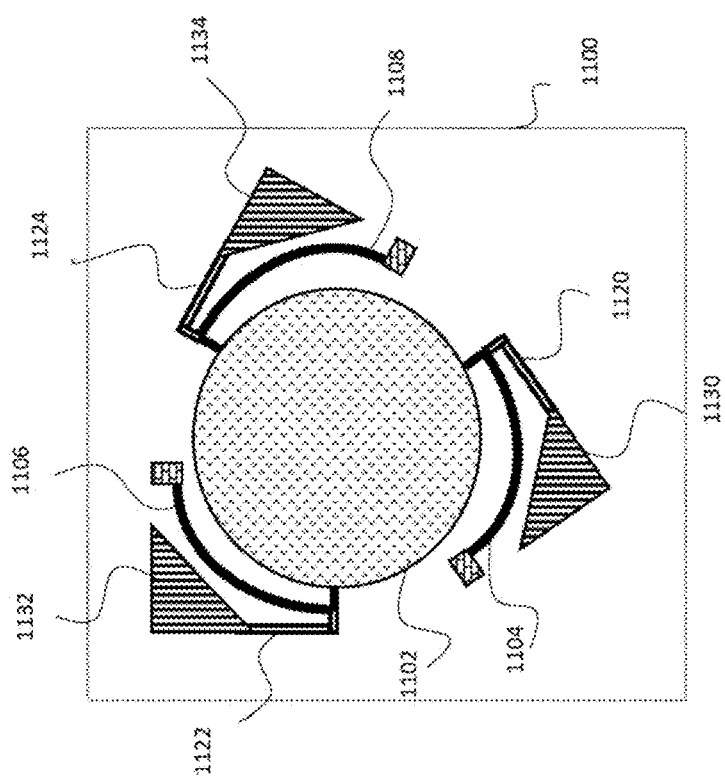

FIGS. 11A and 11B illustrate alternative structures for the coupled oscillators of FIGS. 6A and 6B, respectively. In these structures, the reflector is supported by three suspenders of the first spring structure and the second mode of oscillation is created with three inertial elements, coupled to the reflector with a second spring structure. In the configurations of FIGS. 11A and 11B, the reflector system includes a support 1100, a reflector 1102, and a second spring system with three suspenders 1104, 1106, 1108, which correspond to respective basic parts 500, 502, 504, 506, 508, described with FIG. 5. In addition, the configuration includes three inertial elements 1130, 1132, 1134, elastically coupled to the reflector element with a first spring structure that includes flexible suspenders 1120, 1122, 1124. FIG. 11A represents and arrangement of FIG. 6A, so in each suspender of the first spring structure, a first end of the suspender is coupled to a coupling point in the reflector element, and a second end of the suspender is coupled to an inertial element. In operation, the phase difference in oscillations of either mode in successive coupling points in the reflector is 120 degrees. In configurations of FIGS. 5, 8, 9, and 10, the phase difference is 90 degrees. FIG. 11B represents an arrangement of FIG. 6B. It corresponds by far with FIG. 11A, but in each suspender of the first spring structure, a first end of the suspender is coupled to a coupling point in the second spring structure, and a second end of the suspender is coupled to an inertial element.

Figure 12B:
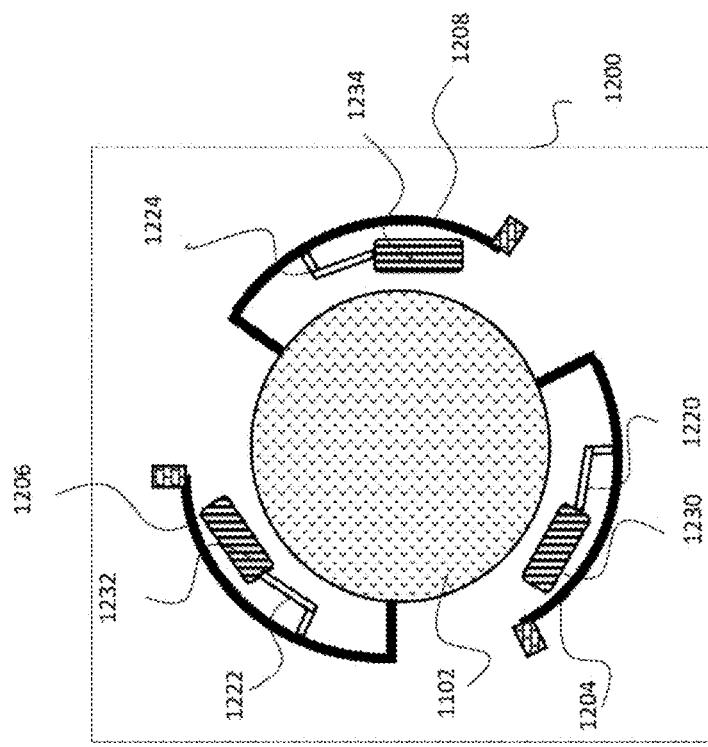
FIGS. 12A and 12B illustrate further alternative structures for the coupled oscillators of FIGS. 6A and 6B.
Figure 12A:
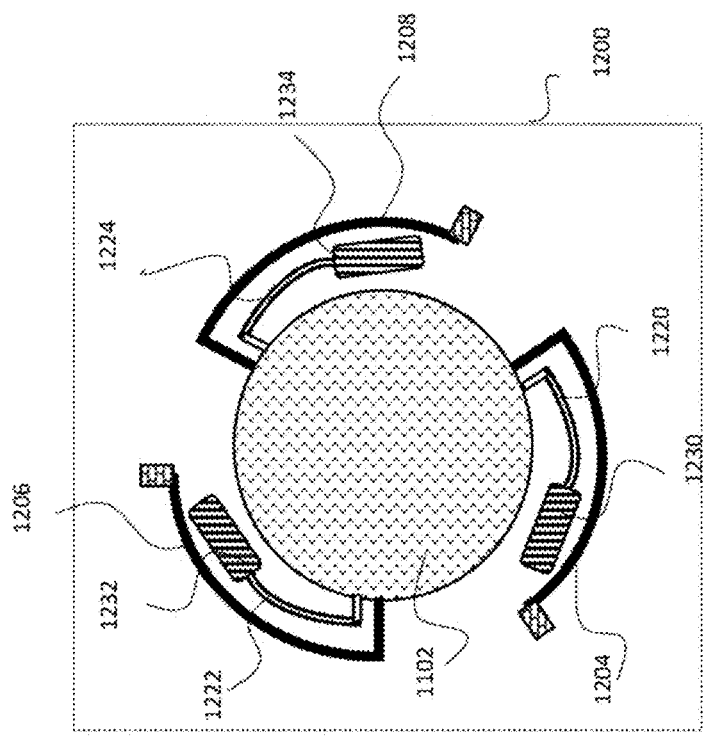

FIGS. 12A and 12B illustrate alternative structures for the coupled oscillators of FIGS. 6A and 6B, respectively. In these structures, the reflector is also supported by three suspenders of the second spring structure and the second mode of oscillation is created with three inertial elements, coupled to the reflector with a first spring structure. As the structures of FIGS. 9 and 10, the structures also use effectively the space within the second spring structure. In the configurations of FIGS. 12A and 12B, the reflector system includes a support 1200, a reflector 1202, and a second spring system with three suspenders 1204, 1206, 1208, which correspond to respective basic parts 500, 502, 504, 506, 508, described with FIG. 5. In addition, the configuration includes three inertial elements 1230, 1232, 1234, elastically coupled to the reflector element with a first spring structure that includes flexible suspenders 1220, 1222, 1224. FIG. 12A represents and arrangement of FIG. 6A, so in each suspender of the first spring structure, a first end of the suspender is coupled to a coupling point in the reflector element, and a second end of the suspender is coupled to an inertial element. In operation, the phase difference in oscillations of either mode in successive coupling points in the reflector is 120 degrees. FIG. 12B represents and arrangement of FIG. 6B. It corresponds by far with FIG. 12A, but in each suspender of the first spring structure, a first end of the suspender is coupled to a coupling point in the second spring structure, and a second end of the suspender is coupled to an inertial element.

Figure 13:
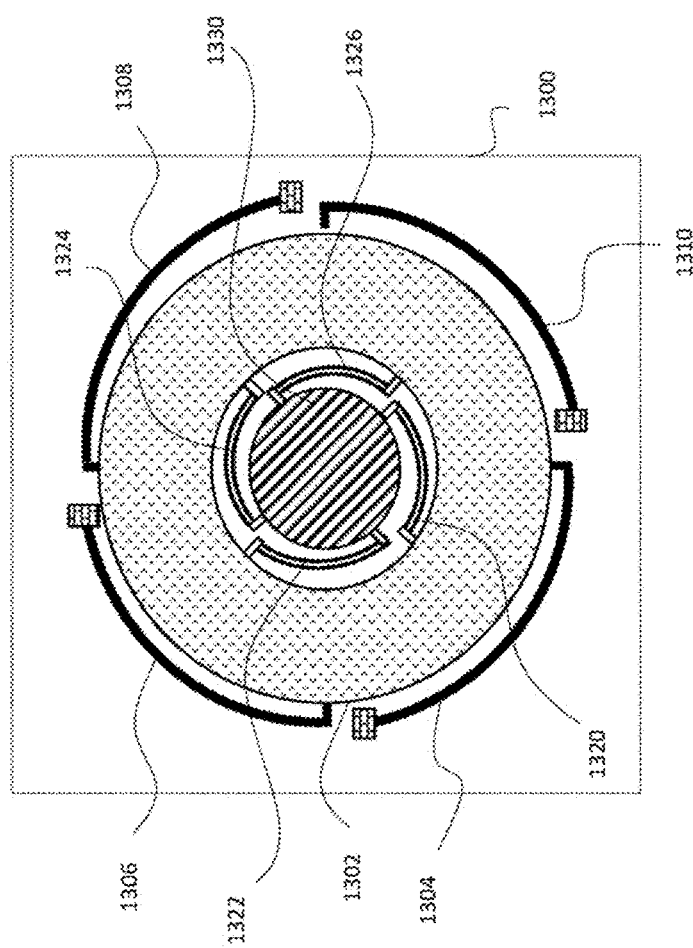
FIG. 13 illustrates a further embodiment, where the inertial element is a rigid mass.

FIG. 13 illustrates a further embodiment, where the inertial element is one rigid mass surrounded by the reflector in the reference plane. In other words, in the non-actuated state of the reflector system, the top surface of the inertial element is planar and aligned with the planar reflective surface of the reflector, and is circumscribed by the planar reflective surface of the reflector. In the configuration of FIG. 13, the circular reflector has an annular form and circumscribes the inertial element. In order to enable reasonable mass for the coupled oscillation, the bottom surface of the inertial element is advantageously not aligned with the bottom surface of the reflector. The dimensions of the reflector and the inertial element may be adjusted to form the coupled oscillator with desired two resonance frequencies. In the configuration of FIG. 13, the reflector system includes a support 1300, a reflector 1302, and a second spring system with four suspenders 1304, 1306, 1308, 1310, which correspond to respective basic parts 500, 502, 504, 506, 508, 510 described with FIG. 5. In addition, the configuration includes the inertial element 1330 elastically coupled to the reflector element with a first spring structure that includes flexible suspenders 1320, 1322, 1324, 1326. In the exemplary configuration of FIG. 13, coupling points of the first spring structure and the second spring structure to the inertial element 1330 are distributed alternately to radii with approximately 45 degrees distance from each other. Alternative coupling structures may be applied within the scope. For example, coupling points of the first spring structure and the second spring structure to the inertial element 1330 may coincide at radii with 90 degrees distance from each other.

Figure 14:
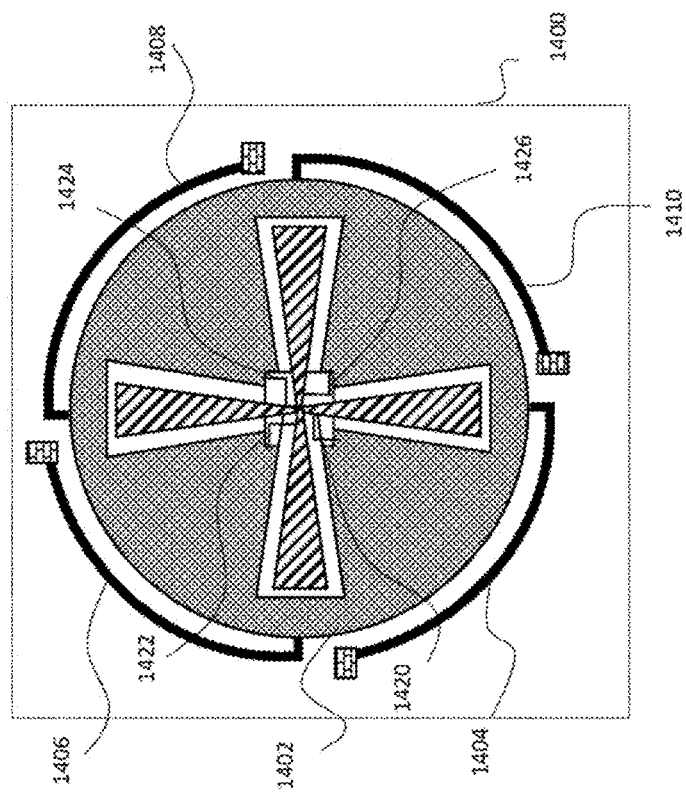
FIG. 14 illustrates a further embodiment, where the inertial element is a rigid mass within the reflector.

FIG. 14 illustrates a further embodiment, where the inertial element is a rigid mass within the reflector in the reference plane. In other words, in the non-actuated state of the reflector system, the top surface of the inertial element is planar and aligned with the planar reflective surface of the reflector, and the planar reflective surface of the reflector circumscribes the inertial element. The bottom surface of the inertial element does not necessarily need to be aligned with the bottom surface of the reflector. In the configuration of FIG. 14, the reflector system includes a support 1400, a reflector 1402, and a second spring system with four suspenders 1404, 1406, 1408, 1410, which correspond to respective basic parts 500, 502, 504, 506, 508, 510 described with FIG. 5. In addition, the configuration includes the inertial element 1430 elastically coupled to the reflector element with a first spring structure that includes flexible suspenders 1420, 1422, 1424, 1426. Advantageously, in this configuration, center part of the light source may be blocked to avoid incidence of a beam to the non-reflective parts of the inertial element and the suspenders of the first spring structure.

As shown, the two modes of oscillation for a circular tilt motion can be implemented with a wide range of different structural variations. A spring effect may be implemented with various suspender configurations including, for example, straight or curved bending parts and straight torsional parts shown herein. The suspenders may even have parts of any other form, as long as the combined form of the suspenders provides the desired spring effect of a coupled oscillator in the out-of-plane direction. The number of suspenders may also vary, though actuation of the circular tilt motion with one or two actuator elements only may be very challenging in practice.

As discussed earlier, the optical element includes a signal processing element that is connected to the reflector system to feed actuation signals to the reflector system, and to receive sense signals from the reflector system. As shown in FIG. 4, a suspender of the second spring structure may be configured to include an actuator element and a sense element, wherein the actuator element may be configured to deflect the suspender according to an actuation signal, and the sense element to output a sense signal according to deflections of the suspender. The signal processing element may be coupled to the second spring structure, for example by wiring through the coupling points to the support, and thereby be configured to receive from such suspender a sense signal, and to provide to said suspender an actuation signal.

The sense signal varies according to detected motion of the suspender, so co-existence of the actuation and sense elements on the suspender enables a feed-back operation wherein the level of the actuation signal to be fed to actuate the suspender is determined based on the level of the detected motion of the suspender. The determined actuation signal may be fed to the suspender in −90 degrees phase shift to the sense signal. In the system disclosed herein, the signal processing element may be configured to feed to an actuator of the suspender an actuation signal that includes a component for actuating the first mode of oscillation and a component for actuating the second mode of oscillation. Moreover, the signal processing element may be configured to provide an actuation signal for maintaining a defined first amplitude in the first mode of oscillation, and a defined second amplitude in the second mode of oscillation.

Figure 15:
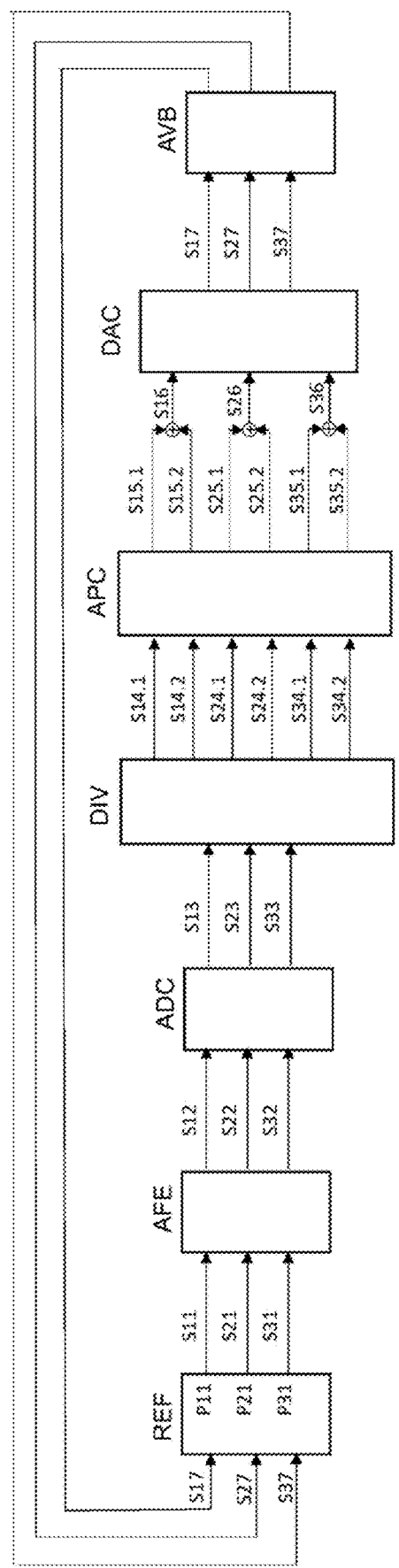
FIG. 15 illustrates main functional elements of a signal processing element applicable with a configuration of three suspenders.

The block chart of FIG. 15 illustrates main functional elements of a signal processing element applicable with a configuration of FIG. 3 wherein the second spring system includes three suspenders. A functional element of block charts shown herein represents here a combination of electrical components, interconnected between one or more inputs and one or more outputs to perform functions described in the following. It is clear that the disclosed functions can be implemented in a number of various ways, by combining different analog and digital components in a manner well known to persons skilled in the art.

Figure 16:
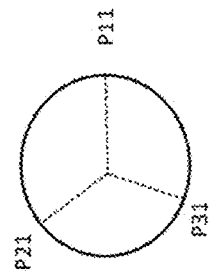
FIG. 16 shows exemplary coupling of three suspenders to the reflector.

As shown in FIG. 16, each of these suspenders of the second spring structure couples to the reflector REF in a coupling point P11, P21, P31. The coupling points may be symmetrically divided into the edge of the reflector such that their positions are separated by a defined angle. In this example, the defined angle is 120 degrees. In FIG. 15, signals S11, S21, S31 represent sense signals generated by sense elements on suspenders of coupling points P11, P21, P31, respectively. Each of these sense signals S11, S21, S31 includes a component of the first mode of oscillation in the first resonance frequency F1, and a component for the second mode of oscillation in the second resonance frequency F2.

The sense signals S11, S21, S31 may be fed to an analog front-end element AFE that scales them for conversion into digital format. The AFE may also contain some initial filtering to reduce unwanted frequencies. For this, the AFE can include, for example, highpass filters, lowpass filter, or both types of filters. The scaled sense signals S12, S22, S32 are fed into an analog-to-digital converter ADC that performs the analog-to-digital conversion and feeds the digital sense signals S13, S23, S33 to a signal separation element DIV. The ADC may also amplify the signals by a constant gain. The DIV separates from each digital sense signal S13, S23, S33 sense signal components S14.1, S24.1, S34.1 of the first mode of oscillation and sense signal components S14.2, S24.2, S34.2 of the second mode of oscillation.

Accordingly, in view of FIG. 15, the sense signal component S14.1 includes a signal component of the first mode of oscillation (with frequency F1) of the digital sense signal 13 that is derived from the scaled sense signal S12. The scaled sense signal S12 is scaled from the sense signal S11 that is received from sense element of a suspender coupled to point P11 in the edge of the reflector REF. Correspondingly, the sense signal component S14.2 includes a signal component of the second mode of oscillation (with frequency F2) in the digital sense signal S13. The sense signal component S24.1 includes a signal component of the first mode of oscillation, and the sense signal component S24.2 includes a signal component of the second mode of oscillation derived from the sense signal S21 of point P21. Correspondingly, the sense signal component S34.1 includes a signal component of the first mode of oscillation, and the digital signal S34.2 includes a signal component of the second mode of oscillation derived from the sense signal S31 of point P31.

The first mode of oscillation for the circular tilt motion in a first frequency F1 and a first amplitude A1 can now be maintained by feeding to an actuator of at least one suspender an actuation signal (drive signal) that is in −90 degrees phase shift to the sense signal of that actuator. Correspondingly, the second mode of oscillation for the circular tilt motion in a second frequency F2 and a second amplitude A2 can be maintained by feeding to an actuator of at least one suspender an actuation signal (drive signal) that is in −90 degrees phase shift to the respective sense signal of that actuator. A sum of a separately amplitude and phase-controlled actuation signal component for the first mode of oscillation, and a separately amplitude and phase controlled actuation signal component for the second mode of oscillation may be provided to an actuator of a suspender.

Advantageously, summed actuation control signals can be provided in consecutive order to suspenders of the second spring structure. Due to the signal separation in DIV, the first amplitude A1 and the second amplitude A2 can be maintained constant separately. The example of FIG. 15 is described in terms of such configuration. However, use of all suspenders for sense and actuation is not mandatory. Neither is use of same actuators for both the first mode of oscillation and the second mode of oscillation. A set of one or more actuators can be dedicated to the first mode of oscillation and another set of one or more actuators can be dedicated to the second mode of oscillation, as long as the −90 degrees phase difference between a sense signal and an actuation signal of one mode of oscillation can be maintained for an actuator, and amplitudes of the modes of oscillation be controlled separately.

In view of FIG. 15, the sense signal components S14.1, S24.1, S34.1 of the first mode of oscillation may be input to an amplitude and phase controlling element APC. Let us look first at the received sense signal component S14.1. The APC is configured to determine from the received sense signal component S14.1 a detected amplitude value, and compare the detected amplitude value with a predefined target value that corresponds to the targeted first amplitude A1. Based on the comparison, the APC is configured to generate an actuation signal component S15.1 that minimizes the difference between the detected amplitude value of S14.1 and the target value. The actuation signal component S15.1 controls the force of actuation in the suspender of P11. If the detected amplitude is too large, the APC will decrease the actuation signal component S15.1, and thereby the actuation force for the first mode of oscillation in the suspender of P11. The APC may even change polarity of gain to create a breaking force to decrease the detected amplitude faster. If the detected amplitude is too small, the APC will increase the actuation signal component S15.1, and thereby the actuation force for the first mode of oscillation in the suspender of P11. The APC also creates a 90 degrees phase shift between the actuation signal component S15.1 and the sense signal component S14.1 (i.e. the sense signal S11). The APC may perform the same control operation to sense signal components S24.1 and S34.1. The phase shift between signals S14.1 and S15.1, signals S24.1 and signals S25.1, and signals S34.1 and S35.1 is thus −90 degrees. The angle between coupling points P11 and P21, and between coupling points P21 and P31 is 120 degrees, so the phase shift between signals S15.1, S25.1 and S35.1, as well as the phase shift between signals S15.2, S25.2, S35.2 is 120 degrees.

In the next phase, the amplitude-controlled and phase shifted signals of the first mode of oscillation and of the second mode of oscillation for each of the actuators are summed. In view of the example in FIG. 15, the actuation signal component S15.1 of the first mode of oscillation and the actuation signal component S15.2 of the second mode of oscillation for the actuator of the suspender coupled to point P11 are summed into a summed actuation signal S16. Similar summing operation is made to signals S25.1 and S25.2 to create a summed actuation signal S26 for the actuator of the suspender coupled to point P21, and to signals S35.1 and S35.2 to create a summed actuation signal S36. At this point the digital summed actuation signals S16, S26, S36 can be converted in a digital-to-analog converter DAC into analog actuation signals S17, S27, S37. The digital-to-analog conversion may be implemented with a constant gain. The digital-to-analog converter may have different gain settings during start up and during "normal operation mode" so that during start up gain is at maximum and after that during "normal operation mode", when maximum drive signal may not be needed, gain can be lowered to achieve smaller quantization step value. The actuation signals S17, S27, S37 that include the amplitude controlled and appropriately phase shifted components of the first mode of oscillation and of the second mode of oscillation may then be buffered in an actuation voltage buffer AVB that controllably feeds them to actuators of respective suspenders, as shown in FIG. 15.

It is noted that the division between the analog and digital domains applied in this implementation is exemplary only. The signal processing for the functional elements described herein can be implemented with various different combinations of digital and/or analog elements in a manner well known to a person skilled in the art.

Figure 17:
FIG. 17 illustrates an exemplary implementation for signal separation in FIG. 15.

FIG. 17 illustrates an exemplary implementation for the signal separation in the DIV of FIG. 15. An incoming digital sense signal like S13 can be divided into two notch filters, each of which rejects a narrow frequency band and leaves the rest of the spectrum little changed. In FIG. 17, n(F1) denotes a notch filter that rejects frequencies in F1, and n(F2) denotes a notch filter that rejects frequencies in F1. The incoming digital sense signal S13 includes component of the first mode of oscillation with frequency F1 and of the second mode of oscillation with frequency F2. The notch filter n(F2) rejects the component of the second mode of oscillation so that after filtering, the outgoing sense signal component S14.1 includes only the component of the first mode of oscillation with frequency F1. Correspondingly, the notch filter n(F1) rejects the component of the second mode of oscillation so that after filtering, the outgoing sense signal component S14.2 includes only the component of the first mode of oscillation with frequency F2. Other means for signal separation may be applied within the scope.

Figure 18:
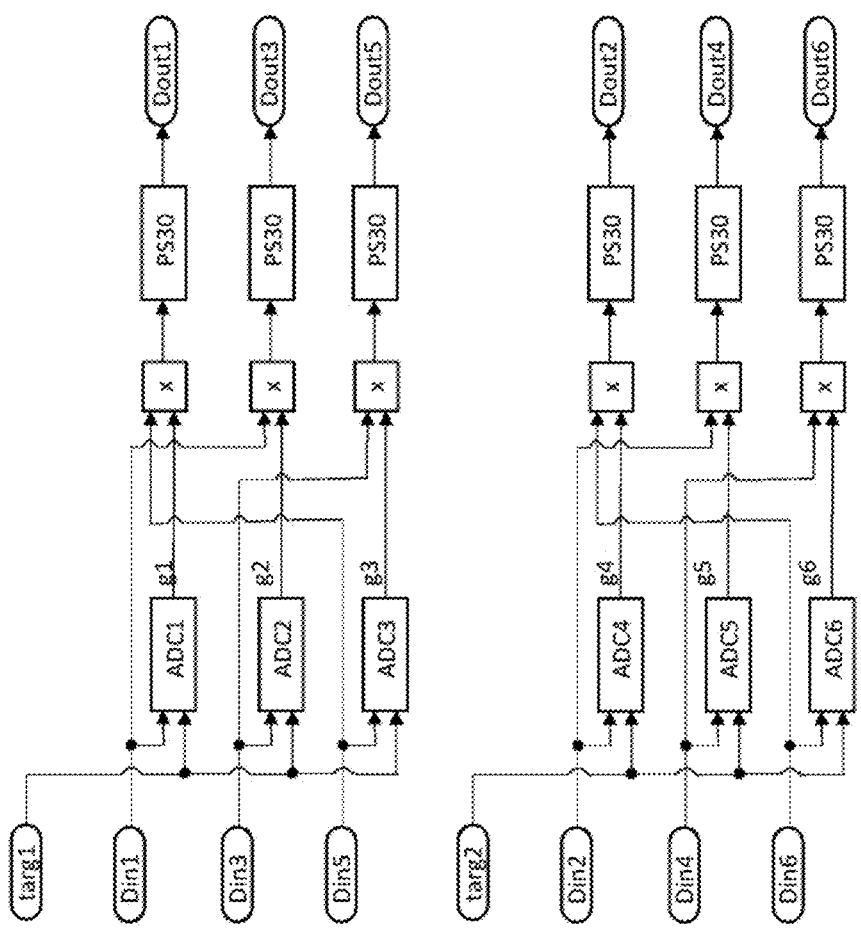
FIG. 18 illustrates an exemplary implementation for amplitude and phase control in FIG. 15.

FIG. 18 illustrates an exemplary implementation for the amplitude and phase control in the APC of FIG. 15. In FIG. 18, inputs Din1, Din3, Din5 correspond to sense signal components S14.1, S24.1 and S34.1 of the first mode of oscillation, respectively. Correspondingly, outputs Dout1, Dout3, Dout5 correspond to sense signal components S15.1, S25.1 and S35.1 of the first mode of oscillation, respectively. The target value that corresponds to the first amplitude of the first mode of oscillation is denoted as targ1. The exemplary structure includes a control loop feedback mechanism where a proportional-integral-derivative controller (PID controller) provides a continuously modulated control of sensed amplitudes of the oscillation. Here the PID controller may be configured to calculate an error value that corresponds to the difference between a detected amplitude value of a received signal and the target value of the PID controller. Based on the error value, the PID controller may implement a correction by computing a gain value that can be used to increase, maintain or decrease the actuation signal components. It is noted that the PID controller is only one option for the implementation. For example, one or two of the proportional, integral or derivative elements may be omitted from the feedback controller.

The example of FIG. 18 includes six functional PID elements ADC1, ADC2, ADC3, ADC4, ADC5, and ADC6. The first ADC1 may input the target value targ1 for the amplitude A1 of the first mode of oscillation, and the sense signal component S14.1 derived from the sense signal S11 of the suspender of the coupling point P11. The first ADC1 then determines the detected amplitude value of S14.1, compares it to targ1, and outputs a gain control value g1 that minimizes the difference between these two. As shown in FIG. 18, the amplitude controlled and −90 degrees phase shifted actuation signal component S15.1 for the actuator of the suspender of the coupling point P11, to be output from Dout1, may then be generated by multiplying the gain control value g1 from the first ADC1 with the digital signal component S34.1 derived from the sense signal of the suspender of the coupling point P31, and phase shifting the multiplied signal by 30 degrees.

A similar arrangement may be applied to generate the actuation signal component S25.1, to be output from Dout3 for the actuator of the suspender of the coupling point P21, and the actuation signal component S35.1, to be output from Dout5 for the actuator of the suspender of the coupling point P31. In FIG. 18, the actuation signal component S25.1 to Dout3 is generated by multiplying the gain control value g2 from the second ADC2 with the sense signal component S14.1 derived from the sense signal of the suspender of the coupling point P11, and phase shifting the multiplied signal by 30 degrees. The actuation signal component S35.1 to Dout5 is generated by multiplying the gain control value g3 from the third ADC3 with the sense signal component S24.1 derived from the sense signal of the suspender of the coupling point P21, and phase shifting the multiplied signal by 30 degrees. It is noted that the amplitude target value targ1 of A1 for all outputs Dout1, Dout3, Dout6 is the same.

In FIG. 18, inputs Din2, Din4, Din6 correspond to sense signal components S14.2, S24.2 and S34.2 of the second mode of oscillation, respectively. Correspondingly, outputs Dout2, Dout4, Dout6 correspond to actuation signal components S15.2, S25.2 and S35.2 of the second mode of oscillation, respectively. An arrangement similar to the one applied for digital signal components of the first mode of oscillation may be applied to generate actuation signal components to be output from outputs Dout2, Dout4, Dout6. In FIG. 18, the actuation signal component S15.2 to Dout2 is generated by multiplying the gain control value g4 from the fourth ADC4 with the sense signal component S34.2 derived from the sense signal of the suspender of the coupling point P31, and phase shifting the multiplied signal by 30 degrees. The actuation signal component S25.2 to Dout4 is generated by multiplying the gain control value g5 from the fifth ADC5 with the sense signal component S14.2 derived from the sense signal of the suspender of the coupling point P11, and phase shifting the multiplied signal by 30 degrees. The actuation signal component S35.2 to Dout6 is generated by multiplying the gain control value g6 from the sixth ADC6 with the sense signal component S24.2 derived from the sense signal of the suspender of the coupling point P21, and phase shifting the multiplied signal by 30 degrees. It is noted that the amplitude target value targ2 of A2 for all outputs Dout2, Dout4, Dout6 is the same.

Figure 19:
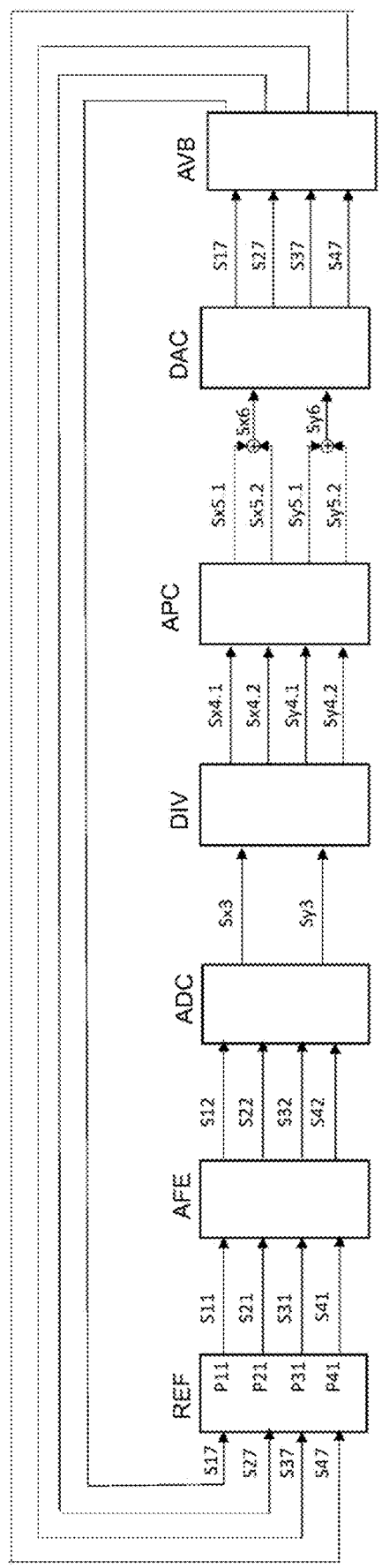
FIG. 19 illustrates main functional elements of a signal processing element applicable with a configuration of four suspenders.
Figure 20:
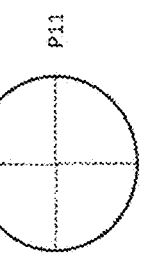
FIG. 20 shows exemplary coupling of four suspenders to the reflector.

The block chart of FIG. 19 illustrates main functional elements of a signal processing element applicable with a configuration like the one in FIG. 5, wherein the second spring system includes four suspenders. As shown in FIG. 20, each of these suspenders of the second spring structure couples to the reflector REF in a coupling point P11, P21, P31, P41. The coupling points may be symmetrically divided into the edge of the reflector such that their positions are separated by a defined angle. In this example, the defined angle is 90 degrees. Signals S11, S21, S31, S41 represent sense signals generated by sense elements on suspenders of coupling points P11, P21, P31, P41, respectively. Each of these signals S11, S21, S31, S41 includes a component of the first mode of oscillation in the first resonance frequency F1, and a component for of the second mode of oscillation in the second resonance frequency F2.

The sense signals S11, S21, S31, S41 are fed to an analog front-end element AFE that scales them for conversion into digital format. The AFE may also contain some initial filtering to reduce unwanted frequencies. For this, the AFE can include, for example, highpass filters, lowpass filters, or both types of filters. In a structure with four suspenders it is possible to process each sense signal separately, as described earlier with FIGS. 15 to 18. Alternatively, it is possible to utilize the inherently orthogonal positioning of the coupling points for differential detection that eliminates, or at least reduces effects of structural variations during operational life of the device. This alternative is described in the example of FIG. 19.

Accordingly, the scaled sense signals S12, S22, S32, S42 may be fed into an analog-to-digital converter ADC that performs the analog-to-digital conversion, and generates two differentially detected signals Sx3 and Sy3. A first differentially detected signal Sx3 results from subtracting signals from opposite positions P11 and P31, and a second differentially detected signal Sy3 results from subtracting signals from opposite positions P21 and P41. The orientation of the opposite positioning of P11 and P31 is denoted to correspond to x-direction and the orientation of the opposite positioning of P21 and P41 is thus denoted to correspond to y-direction, which is orthogonal to the x-direction. ADC may also amplify the signals Sx3 and Sy3 by introducing a constant gain G such that Sx3=G(S12−S32) and Sy3=G (S22−S42).

The ADC may then feed the differentially detected signals Sx3 and Sy3 to a signal separation element DIV. The DIV separates from Sx3 and Sy3 sense signal components Sx4.1, Sx4.1 of the first mode of oscillation and sense signal components Sx4.2, Sy4.2 of the second mode of oscillation. In view of FIG. 19, the sense signal component Sx4.1 includes a signal component of the first mode of oscillation (with frequency F1) of the differentially detected signal Sx3, i.e. the signal derived differentially from the analog signals S12 and S32. These analog signals were scaled from the sense signal S11 that is received from sense element of a suspender coupled to point P11, and from the sense signal S31 that is received from sense element of a suspender coupled to point P31 in the edge of the reflector REF. Correspondingly, the sense signal component Sx4.2 includes a signal component of the second mode of oscillation (with frequency F2) of the differentially detected signal Sx3, i.e. the signal derived differentially through suspenders of points P11 and P31. The sense signal component Sy4.1 includes a signal component of the first mode of oscillation (with frequency F1) of the differentially detected signal Sy3, i.e. the signal that is derived differentially from the analog signals S22 and S42. These analog signals were scaled from the sense signal S21 that is received from sense element of a suspender coupled to point P21, and from the sense signal S41 that is received from sense element of a suspender coupled to point P41 in the edge of the reflector REF.

Correspondingly, the sense signal component Sy4.2 includes a signal component of the second mode of oscillation (with frequency F2) of the differentially detected signal Sy3, i.e. the signal derived differentially through suspenders of points P21 and P41.

Figure 21:
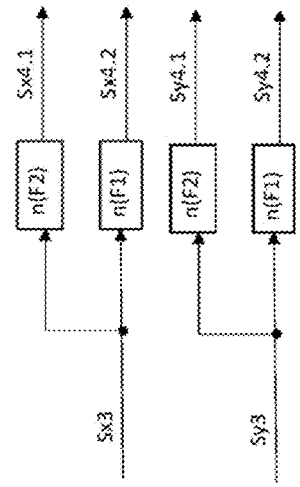
FIG. 21 illustrates an exemplary implementation for signal separation in FIG. 19.

FIG. 21 illustrates an exemplary implementation for the signal separation in the DIV of FIG. 19. An incoming differentially detected signal Sx3 can be divided into two notch filters, each of which rejects a narrow frequency band and leaves the rest of the spectrum little changed. In FIG. 21, n(F1) again denotes a notch filter that rejects frequencies in F1 and n(F2) denotes a notch filter that rejects frequencies in F1. The incoming differentially detected signals Sx3 and Sy3 include a component of the first mode of oscillation with frequency F1 and of the second mode of oscillation with frequency F2. The notch filter n(F2) rejects the component of the second mode of oscillation so that after filtering, the outgoing sense signal components Sx4.1 and Sy4.1 include only the component of the first mode of oscillation with frequency F1. Correspondingly, the notch filter n(F1) rejects the component of the second mode of oscillation so that after filtering, the outgoing sense signal components Sx4.2 and Sy4.2 include only the component of the first mode of oscillation with frequency F2. Other means for signal separation may be applied within the scope.

Referring back to FIG. 19, the digital signal components Sx4.1, Sx4.2, Sy4.1, Sy4.2 may be input to an amplitude and phase controlling element APC. As will be described in more detail with FIG. 22, the APC is configured to determine from the received signals Sx4.1, Sy4.1, a detected amplitude value, and compare the detected amplitude value with a predefined target value that corresponds to the targeted first amplitude A1. Based on the comparison, the APC is configured to generate actuation signal components Sx5.1 and Sy5.1 that minimize the difference between the detected amplitude value and the target value of A1. Correspondingly, the APC is configured to determine from the received signals Sx4.2, Sy4.2, a detected amplitude value, and compare the detected amplitude value with a predefined target value that corresponds to the targeted second amplitude A2. Based on the comparison, the APC is configured to generate actuation signal components Sx5.2 and Sy5.2 that minimize the difference between the detected amplitude value and the target value of A2.

The APC also creates a −90 degrees phase shift between the drive signal and the sense signal of the suspenders. In the x-direction orientation, this means a −90 degrees phase shift between the actuation signal component Sx5.1 and the signal Sx4.1, as well as between the actuation signal component Sx5.2 and the signal Sx4.2. Correspondingly, in the y-direction orientation, this means a −90 degrees phase shift between the actuation signal component Sy5.1 and the signal Sy4.1, as well as between the actuation signal component Sy5.2 and the signal Sy4.2.

In the next phase, the amplitude controlled and phase shifted signals of the first mode of oscillation, and the separately amplitude controlled and phase shifted signals of the second mode of oscillation for each of the actuators are summed for digital to analog conversion. In view of the example in FIG. 19, the actuation signal component Sx5.1 of the first mode of oscillation and the actuation signal component Sx5.2 of the second mode of oscillation in the x-direction are summed into a summed actuation signal Sx6. Similar summing operation is made to signals Sy5.1 and Sy5.2 to create a summed actuation signal Sy6 in the y-direction. At this point the digital summed actuation signal Sx6 can be converted in a digital-to-analog converter DAC into two analog actuation signals S17, S37 for actuation of suspenders of P11 and P31, and the digital summed actuation signal Sy6 can be converted into two analog actuation signals S17, S37 for actuation of suspenders of P21 and P41. The conversion may be implemented with a constant gain. The actuation signals S17, S27, S37, S47 that include the amplitude controlled and appropriately phase shifted components of the first mode of oscillation and of the second mode of oscillation may then be buffered in an actuation voltage buffer AVB that controllably feeds them to actuators of respective suspenders, as shown in FIG. 16.

Figure 22:
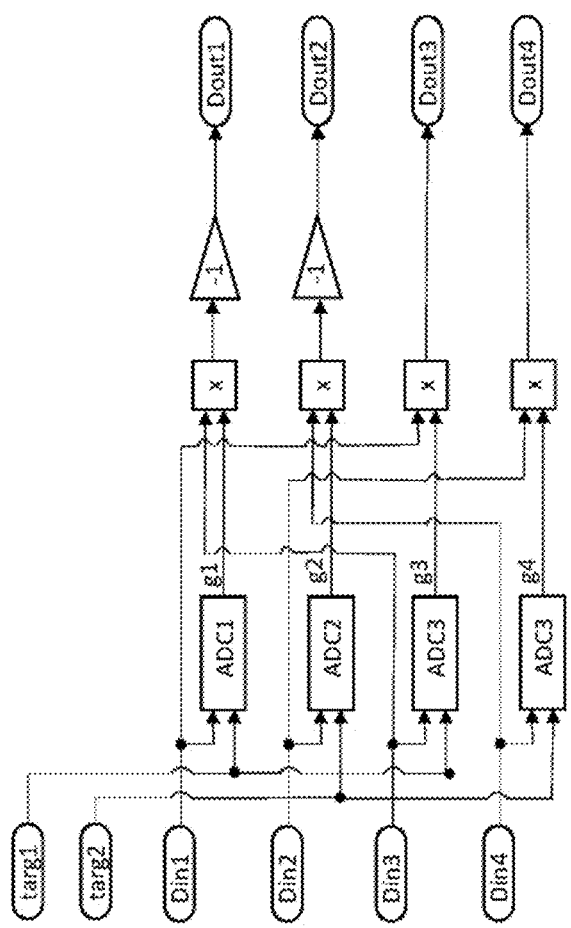
FIG. 22 illustrates an exemplary implementation for amplitude and phase control FIG. 19.

FIG. 22 illustrates an exemplary implementation for the amplitude and phase control in the APC of FIG. 19. In FIG. 22, inputs Din1, Din3 correspond to sense signal components Sx4.1, Sy4.1 of the first mode of oscillation, respectively. Correspondingly, outputs Dout1, Dout3 correspond to actuation signal components Sx5.1, Sy5.1 of the first mode of oscillation, respectively. Inputs Din2, Din4 correspond to sense signal components Sx4.2, Sy4.2 of the second mode of oscillation, and outputs Dout2, Dout4 correspond to actuation signal components Sx5.2, Sy5.2 of the second mode of oscillation, respectively. The target value that corresponds to the first amplitude A1 of the first mode of oscillation is denoted as targ1, and the target value that corresponds to the second amplitude A2 of the second mode of oscillation is denoted as targ2.

The example of FIG. 19 includes four functional PID elements ADC1, ADC2, ADC3, ADC4. The first ADC1 may input the target value targ1 for the amplitude A1 of the first mode of oscillation, and the sense signal component Sx4.1 of the first mode of oscillation. The first ADC1 then determines the detected amplitude value of Sx4.1, compares it to targ1, and outputs a gain control value g1 that minimizes the difference between these two. In this example, orthogonality of the two directions of differential detection may be utilized in generation of actuation signals by using sensed signals in the x-direction orientation to generate signals in the y-direction orientation, and vice versa.

Accordingly, as shown in FIG. 22, the amplitude controlled and −90 degrees phase shifted actuation signal component Sx5.1 for the first mode of oscillation in the x-direction orientation, to be output from Dout1, may be generated by multiplying the gain control value g1 from the first ADC1 with the orthogonal sense signal component Sy4.1 in Din3, and phase shifting the multiplied signal by 180 degrees. A sense signal component Sx5.2 for the second mode of oscillation in the x-direction orientation, to be output from Dout2, may be generated by multiplying the gain control value g2 from the second ADC2 with the orthogonal sense signal component Sy4.2 in Din4, and phase shifting the multiplied signal by 180 degrees. An actuation signal component Sy5.1 for the first mode of oscillation in the y-direction orientation, to be output from Dout3, may be generated by multiplying the gain control value g3 from the third ADC3 with the orthogonal sense signal component Sx4.1 in Din1. An actuation signal component Sy5.2 for the second mode of oscillation in the y-direction orientation, to be output from Dout4, may be generated by multiplying the gain control value g4 from the fourth ADC3 with the orthogonal sense signal component Sx4.2 in Din2.

Figure 23:
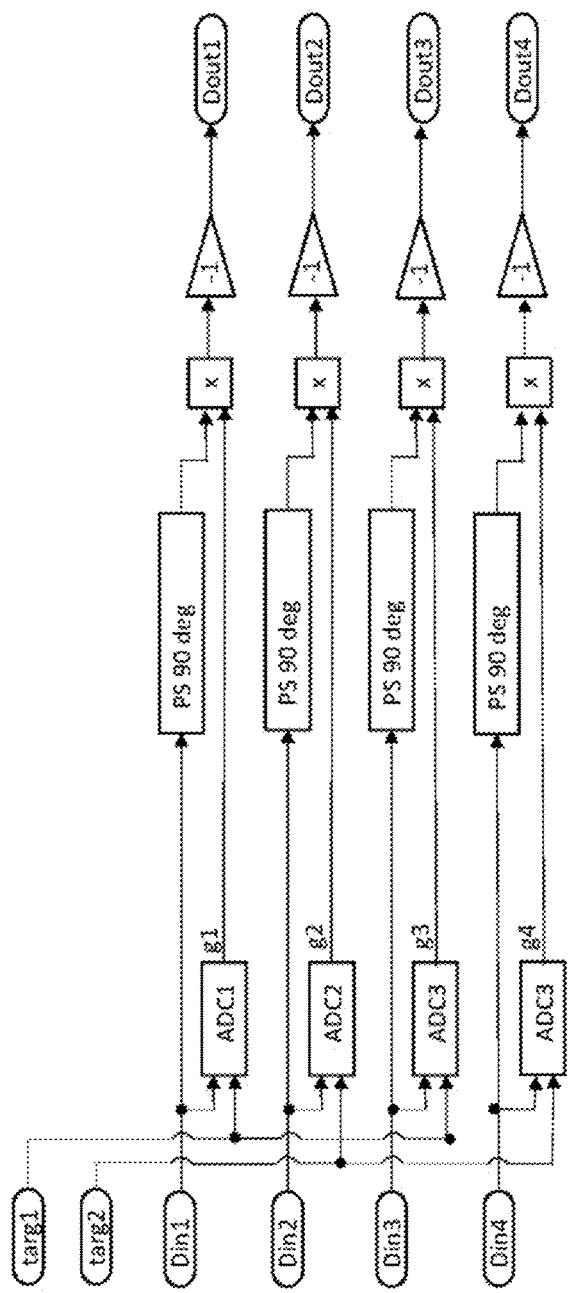
FIG. 23 illustrates another exemplary implementation for amplitude and phase control in FIG. 19.

FIG. 23 illustrates another exemplary implementation for the amplitude and phase control in the APC of FIG. 19. In FIG. 23, signals in inputs Din1, Din2, Din3, Din4 and in outputs Dout1, Dout2, Dout3, Dout4, and target values targ1, targ2 correspond to the ones described with FIG. 22. Also gain control elements AGC1, AGC2, AGC3, AGC4 operate as described with FIG. 22.

In this example, orthogonality of the two directions of differential detection is not utilized in generation of actuation signals, but the required phase shift is implemented with a 90 degree phase shifting component PS 90 deg. Accordingly, the amplitude controlled and −90 degrees phase shifted actuation signal component Sx5.1 for the first mode of oscillation in the x-direction orientation, to be output from Dout1, may be generated by multiplying the gain control value g1 from the first ADC1 with a 90 degrees phase shifted sense signal component Sx4.1 in Din1, and phase shifting the multiplied signal by 180 degrees. An actuation signal component Sx5.2 for the second mode of oscillation in the x-direction orientation, to be output from Dout2, may be generated by multiplying the gain control value g2 from the second ADC2 with a 90 degrees phase shifted sense signal component Sx4.2 in Din2, and phase shifting the multiplied signal by 180 degrees. An actuation signal component Sy5.1 for the first mode of oscillation in the y-direction orientation, to be output from Dout3, may be generated by multiplying the gain control value g3 from the third ADC3 with a 90 degrees phase shifted sense signal component Sy4.1 in Din3. An actuation signal component Sy5.2 for the second mode of oscillation in the y-direction orientation, to be output from Dout4, may be generated by multiplying the gain control value g4 from the fourth ADC3 with a 90 degrees phase shifted sense signal component Sy4.2 in Din4.

Figure 24:
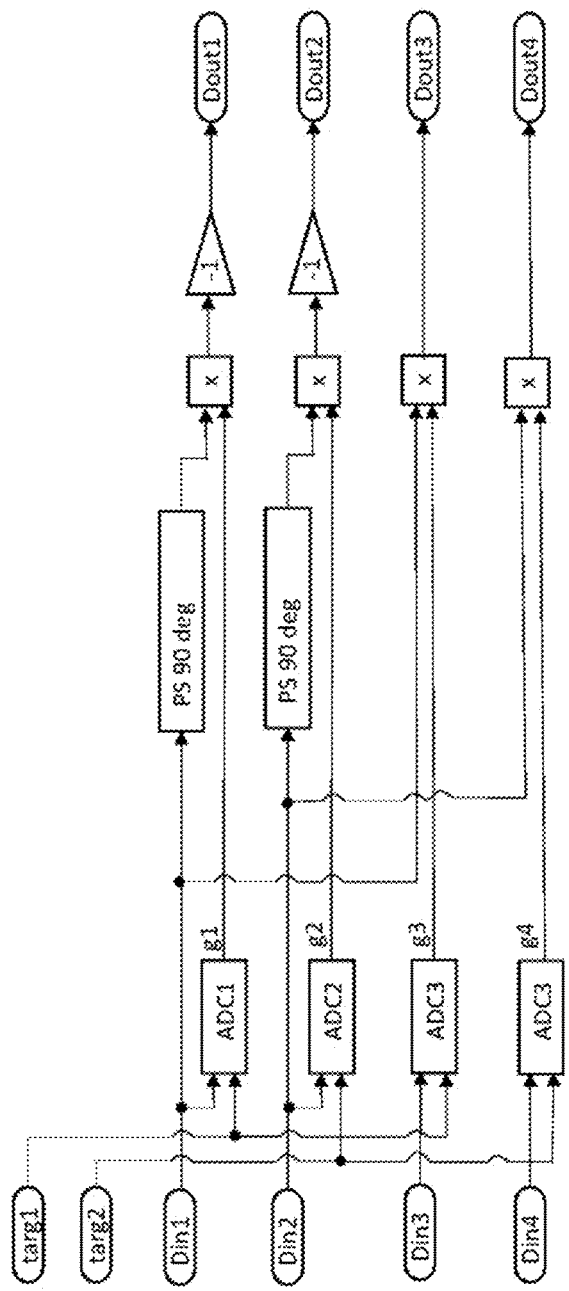
FIG. 24 illustrates another exemplary implementation for amplitude and phase control in FIG. 19.

FIG. 24 illustrates another exemplary implementation for the amplitude and phase control in the APC of FIG. 19. Also in FIG. 24, signals in inputs Din1, Din2, Din3, Din4 and in outputs Dout1, Dout2, Dout3, Dout4, and target values targ1, targ2 correspond to the ones described with FIG. 22. Also gain control elements AGC1, AGC2, AGC3, AGC4 operate as described with FIG. 22.

This example is a mix of the two options applied in FIGS. 22 and 23. Accordingly, as in FIG. 23, the amplitude controlled and −90 degrees phase shifted actuation signal component Sx5.1 for the first mode of oscillation in the x-direction orientation, to be output from Dout1, may be generated by multiplying the gain control value g1 from the first ADC1 with a 90 degrees phase shifted sense signal component Sx4.1 in Din1, and phase shifting the multiplied signal by 180 degrees. An actuation signal component Sx5.2 for the second mode of oscillation in the x-direction orientation, to be output from Dout2, may be generated by multiplying the gain control value g2 from the second ADC2 with a 90 degrees phase shifted sense signal component Sx4.2 in Din2, and phase shifting the multiplied signal by 180 degrees. However, using the inherent phase difference between successive position in the x-direction orientation and y-direction orientation suspenders, an actuation signal component Sy5.1 for the first mode of oscillation in the y-direction orientation, to be output from Dout3, may be generated by multiplying the gain control value g3 from the third ADC3 with the orthogonal sense signal component Sx4.1 in Din1. An actuation signal component Sy5.2 for the second mode of oscillation in the y-direction orientation, to be output from Dout4, may be generated by multiplying the gain control value g4 from the fourth ADC3 with the orthogonal sense signal component Sx4.2 in Din2.

Figure 25:
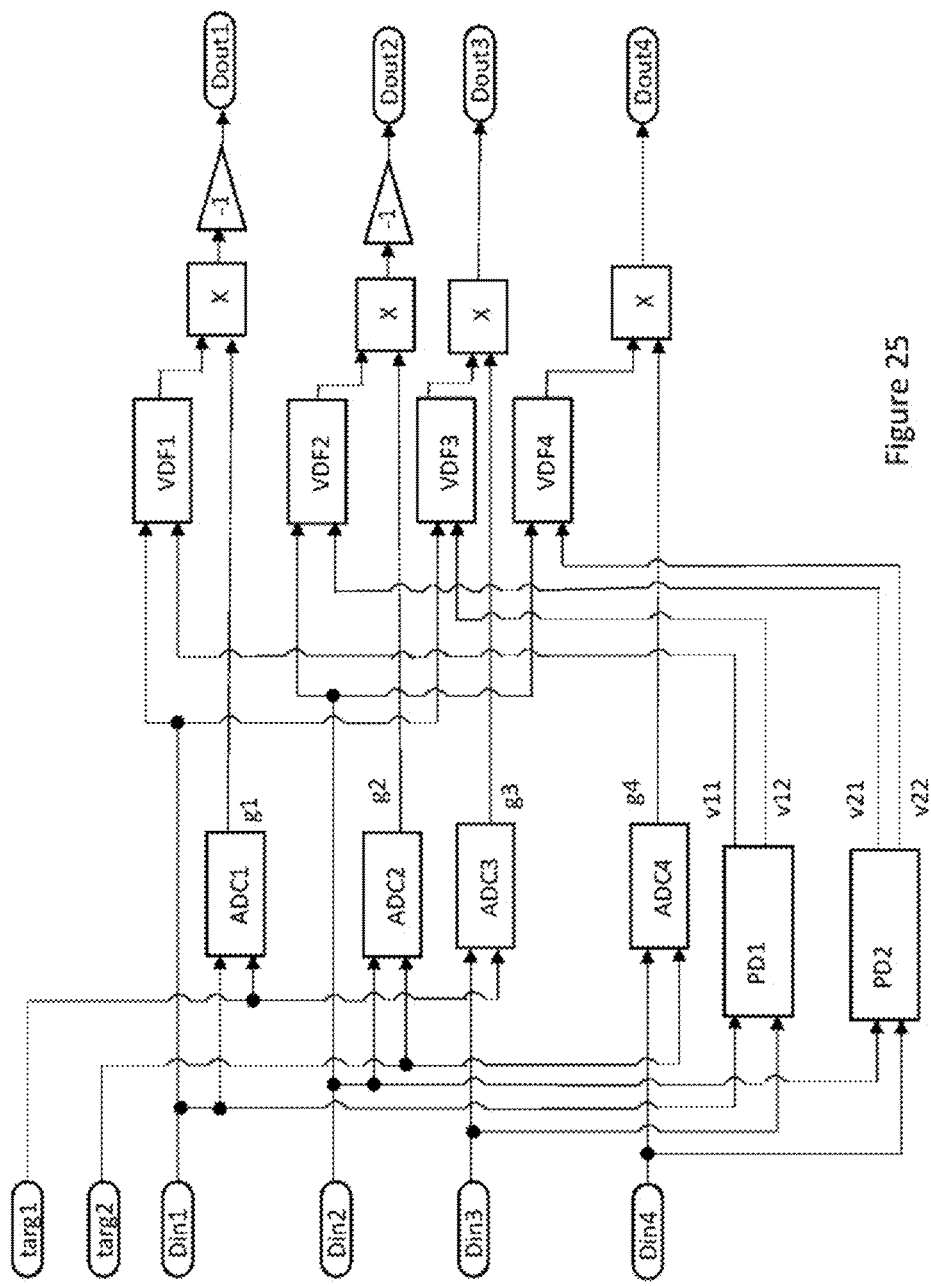
FIG. 25 illustrates a further exemplary implementation for amplitude and phase control in FIG. 19.

FIG. 25 illustrates another exemplary implementation for the amplitude and phase control in the APC of FIG. 19. Also in FIG. 25, signals in inputs Din1, Din2, Din3, Din4 and in outputs Dout1, Dout2, Dout3, Dout4, and target values targ1, targ2 correspond to the ones described with FIG. 22. Also gain control elements AGC1, AGC2, AGC3, AGC4 operate as described with FIG. 22.

The example implementation of FIG. 25 is by far similar to the one in FIG. 24, but for added accuracy, the phase for the actuation signals is made to depend on detected phase difference between signals of the x-direction orientation and of the y-direction orientation. For example, in view of FIG. 25, it may be seen that the controlling gain g1 for Sx5.1 in Dout1 may be determined as earlier by comparing amplitude of the digital signal component Sx4.1 in Din1 with the target value targ1 for the first mode of oscillation. The sense signal component Sx4.1 in Din1 represents phase of first mode of oscillation in the x-direction orientation, and the sense signal component Sy4.1 in Din3 represents phase of first mode of oscillation in the y-direction orientation. Phase detectors PD1, PD2 provide a feed-back mechanism that compares phase difference between two input signals from the sense side, and based on the comparison, computes phase control signals that can be applied in generation of the drive signals such that the 90 degrees phase difference between signals of the x-direction orientation and of the y-direction orientation is accurately maintained. Accordingly, the sense signal components of the x-direction orientation and of the y-direction orientation can be selectively input to phase detectors PD1, PD2. The phase control signals from phase detectors PD1, PD2 may be fed to variable delay filters VDF1, VDF2, VDF3, VDF4, which are configured to adjust phase of an incoming signal according to an input phase control signal.

In more detail, in FIG. 25, the sense signal component Sx4.1 in Din1 and the sense signal component Sy4.1 in Din3 are input to a first phase detector PD1, that outputs two phase correction values v11, v12. The PD1 is configured to determine a first phase correction value v11 that aims to maintain the initial 90 degrees phase difference between the input signal components Sx4.1 in Din1 and Sy4.1 in Din3. The sense signal component Sx4.1 in Din1 needs an inherent phase shift of +90 degrees, so PD1 determines a value v11 that implements the inherent phase shift, and provides an adjustment for implementing said aim. The first phase correction value v11 of PD1 may thus be fed to the VDF1, which then uses v11 to adjust the phase of the sense signal component Sx4.1 from Din1. In order to derive the actuation signal component Sx5.1 to Dout1, the resulting phase adjusted signal is multiplied with the gain control value g1 from the ADC1, and phase shifted by 180 degrees.

The PD1 is configured to determine also a second phase correction value v12 that is also aimed to maintain the initial 90 degrees phase difference between the input signal components Sx4.1 in Din1 and Sy4.1 in Din3, but does not introduce inherent additional phase shift to the digital signal component Sy4.1 in Din3. The second phase correction value v12 of PD1 may thus be fed to the VDF3, which then uses v12 to adjust the phase of the sense signal component Sx4.1 from Din1. In order to derive the actuation signal component Sy5.1 to Dout3, the resulting phase adjusted signal is multiplied with the gain control value g3 from the ADC3.

Correspondingly, for the second mode of oscillation, the sense signal component Sx4.2 in Din2 and the sense signal component Sy4.2 in Din4 may be input to a second phase detector PD2. The PD2 is configured to determine a first phase correction value v21 that aims to maintain the initial 90 degrees phase difference between the input signal components Sx4.2 in Din2 and Sy4.2 in Din4. The sense signal component Sx4.2 in Din2 needs an inherent phase shift of +90 degrees, so PD2 determines a value v21 that implements the inherent phase shift, and provides an adjustment for implementing said aim. The first phase correction value v21 of PD2 may thus be fed to the VDF2 that then uses v21 to adjust the phase of the sense signal component Sx4.2 from Din2. In order to derive the actuation signal component Sx5.2 to Dout2, the resulting phase adjusted signal is multiplied with the gain control value g2 from the ADC2, and phase shifted by 180 degrees.

The PD2 is configured to determine also a second phase correction value v22 that is also aimed to maintain the initial 90 degrees phase difference between the input signal components Sx4.2 in Din2 and Sy4.2 in Din4, but does not introduce inherent additional phase shift to the sense signal component Sy4.2 in Din4. The second correction value v22 of PD2 may thus be fed to the VDF4, which then uses v22 to adjust the phase of the sense signal component Sx4.2 from Din2. In order to derive the actuation signal component Sy5.2 to Dout4, the resulting phase adjusted signal is multiplied with the gain control value g4 from the ADC4.

FIGS. 22 to 25 illustrate exemplary implementation options for the amplitude and phase control in the optical device. Based on the description, a person skilled in the art can easily generate further variations that fall within the scope of protection.

A frequent design principle is to maximize the area of the reflective surface in the available surface area of the optical device. This means that the mass of the one or more inertial elements suspended to form the coupled oscillator must not be insignificant in relation to the mass of the reflector. FIGS. 5 and 8 illustrate designs where an outer surface area of a device is effectively used to maximize the mass of the inertial elements. Optical MEMS devices are often manufactured from layered solid structures, which include two conductive layers, separated by a thin insulating layer. Examples of such structures include silicon-on-insulator (SOI) and cavity-silicon-on-insulator (cavity-SOI) wafers. A SOI-wafer typically comprises a handle wafer layer, a buried oxide (BOX) layer, and a device layer. The handle wafer layer is usually the thickest part, some hundreds of micron thick, while the device layer is typically tens of microns thick. The BOX layer is typically from fraction of a micron to a few microns thick. The inertial elements do not have any electrical role in the operation of the device, which makes it now possible to increase their masses without increasing required surface area of the optical device. The side view scheme in FIG. 26 illustrates a configuration where material of the handle layer of a layered structure is used to increase the inertial mass coupled to the reflector through the layers in the vertical direction.

Figure 26:
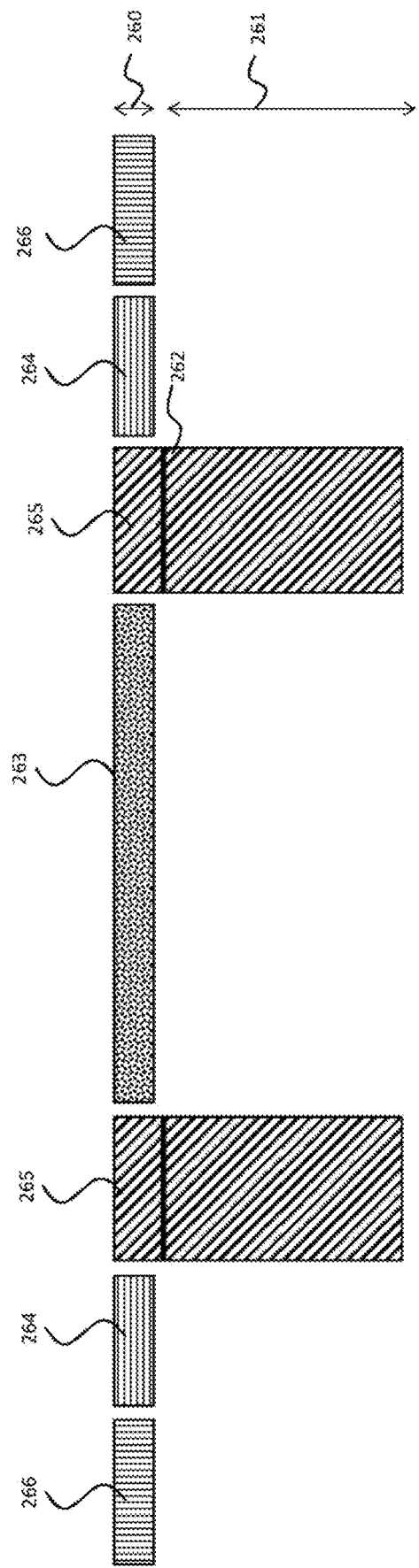
FIG. 26 illustrates a configuration with increased inertial masses.

The example of FIG. 26 shows elements of the coupled oscillator in a side projection of a layered wafer structure. The layered structure includes a device layer 260, a handle layer 261, and an insulating layer 262 between them. In the center of the layer is a reflector 263. A first spring structure 264 couples inertial elements 265 to the reflector, and a second spring structure 266 couples the reflector, the inertial elements and the first spring structure to the support. If the layers are considered to extend horizontally, one or more, preferably all inertial elements are manufactured to form a solid structure that extends vertically from the device layer 260 at least partially to the handle layer 261. In FIG. 26, the elements in the device layer show in the order of FIGS. 9 and 10, but the arrangement is applicable to other designs, as well. For example, in the embodiment of FIG. 13, the inertial element, circumscribed by the reflector, can be the made of the layered structure.

The invention claimed is:

1. An optical device that includes a reflector system and a signal processing element, wherein the reflector system comprises:

a support;
a reflector that includes a planar reflective surface, the reflector being suspended from the support such that in a non-actuated state of the reflector, the planar reflective surface forms a reflector reference plane;
one or more inertial elements;
a first spring structure elastically coupling the one or more inertial elements to motions of the reflector;
a second spring structure elastically coupling the reflector, the inertial elements and the first spring structure to the support;
wherein the signal processing element is configured to provide to the second spring structure actuation signals for a circular tilt motion in which a normal at a point of symmetry of the planar reflective surface circulates around a normal of the reflector reference plane at the point of symmetry;
wherein the reflector, the first spring system, the second spring system and the inertial elements are dimensioned to form a coupled oscillator with two modes of oscillation for the circular tilt motion, a first mode oscillation formed of a superposition of a first rotary oscillation about a first axis of rotation and a second rotary oscillation about a second axis of rotation in a first resonance frequency and a second mode of oscillation formed of a superposition of a third rotary oscillation about a third axis of rotation and a fourth rotary oscillation about a fourth axis of rotation in a second resonance frequency that is different from the first resonance frequency;
wherein the signal processing element is configured to control the actuation signals to maintain a first amplitude in the first mode of oscillation, and a second amplitude in the second mode of oscillation.

2. The optical device of claim 1, wherein the second spring structure includes flexible suspenders wherein a first end of each suspender is coupled to a first coupling point in the reflector, a second end of the suspender is coupled to a second coupling point in the support, and the suspender is configured to deflect in an out-of-plane direction that is parallel to the normal of the reflector reference plane.

3. The optical device of claim 2, wherein an inertial element is a rigid mass within the reflector in the reference plane.

4. The optical device of claim 2, wherein
each suspender of the second spring structure includes an actuator element and a sense element, the actuator element being configured to deflect the suspender according to an actuation signal, and the sense element being configured to output a sense signal according to deflections of the suspender;
the signal processing element is coupled to the second spring structure and configured to receive from each suspender of the second spring structure a sense signal, and to provide to said suspender an actuation signal for actuating the reflector in the first mode of oscillation and in the second mode of oscillation.

5. The optical device of claim 1, wherein in each suspender of the first spring structure, a first end of the suspender is coupled to a coupling point in the reflector or in the second spring structure, and a second end of the suspender is coupled to an inertial element.

6. The optical device of claim 5, wherein the first coupling point of each suspender is in the outer edge of the reflector.

7. The optical device of claim 6, wherein the first coupling points of suspenders of the first spring structure are divided evenly to the outer edge of the reflector.

8. The optical device of claim 2, wherein the suspenders of the second spring structure include an elongate elastic element on which the actuator element and the sense element extend, the actuator element and the sense element being electrically separate but mechanically coupled side by side.

9. The optical device of claim 8, wherein the elongate elastic element is a bending part of a suspender.

10. The optical device of claim 9, wherein the suspender includes also a torsional part that extends perpendicularly in an in-plane direction between one end of the bending part and the first coupling point.

11. The optical device of claim 1, wherein the resonance frequencies of the two modes of oscillation are set in relation to each other such the circular tilt motion repeats itself with a predefined frame rate.

12. The optical device of claim 11, wherein the relation is defined as:

$$F_2 = (F_1 \pm f_{FR})/n$$

where $f_{FR}$ is the frame rate, $F_1$ is the first resonance frequency, $F_2$ is the second resonance frequency, and n is an integer number.

13. The optical device of claim 1, wherein the signal processing element includes a signal separation element that is configured to separate from a sense signal of at least one sense element sense signal components of the first mode of oscillation and sense signal components of the second mode of oscillation.

14. The optical device of claim 13, wherein the signal separation element is configured to input the sense signal into two parallel notch filters, one of which rejects frequencies in the first resonance frequency and the other one of which rejects frequencies in the second resonance frequency, and use outputs of the two notch filters as signal components of the first mode of oscillation and signal components of the second mode of oscillation.

15. The optical device of claim 13, wherein the signal processing element includes an amplitude and phase control element, wherein the amplitude and phase control element is configured to input the components of the first mode of oscillation and signal components of the second mode of oscillation of the sense signal of the sense element;

the amplitude and phase control element is configured to determine a detected amplitude for the first mode of oscillation and for the second mode of oscillation;

the amplitude and phase control element is configured to generate an actuation signal component for the first mode of oscillation such that a difference between the detected amplitude for the first mode of oscillation and the first amplitude is minimized;

the amplitude and phase control element is configured to generate an actuation signal component for the second mode of oscillation such that a difference between a detected amplitude for the second mode of oscillation and the second amplitude is minimized.

16. The optical device of claim 15, wherein the amplitude and phase control element is configured to generate the actuation signal components such a phase difference between each sense signal component and a corresponding actuation signal component is −90 degrees.

17. The optical device of claim 15, wherein the signal processing element includes a summing element configured to form an actuation signal for at least one actuator element from a sum of the actuation signal component for the first mode of oscillation and the actuation signal component for the second mode of oscillation.

18. The optical device of claim 15, wherein the amplitude and phase control element includes a proportional-integral-derivative controller.

19. The optical device of claim 1, wherein
the reflector, the first spring system, the second spring system and the inertial elements are formed of a layered wafer structure that includes a device layer and a handle layer;
one or more of the inertial elements are manufactured to form a solid structure that extends from the device layer at least partially to the handle layer.

* * * * *